US012763669B2

(12) United States Patent
Liu et al.

(10) Patent No.: US 12,763,669 B2
(45) Date of Patent: Oct. 13, 2026

(54) COORDINATED FAULT-TOLERANT CONTROL METHOD

(71) Applicant: Delta Electronics (Shanghai) Co., Ltd., Shanghai (CN)

(72) Inventors: Hong Liu, Shanghai (CN); Sanyuan Ouyang, Shanghai (CN); Baihui Song, Shanghai (CN); Wen Zhang, Shanghai (CN); Yuxin Han, Shanghai (CN); Cheng Lu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 318 days.

(21) Appl. No.: 18/753,866

(22) Filed: Jun. 25, 2024

(65) Prior Publication Data

US 2025/0007392 A1 Jan. 2, 2025

(30) Foreign Application Priority Data

Jun. 30, 2023 (CN) ......................... 202310800662.6

(51) Int. Cl.
*H02M 1/32* (2007.01)
*H02M 3/335* (2006.01)

(52) U.S. Cl.
CPC ....... *H02M 1/325* (2021.05); *H02M 3/33571* (2021.05); *H02M 3/33576* (2013.01)

(58) Field of Classification Search
CPC ............. H02M 1/325; H02M 3/33571; H02M 3/33576
See application file for complete search history.

(56) References Cited

U.S. PATENT DOCUMENTS

| | | | | |
|---|---|---|---|---|
| 9,571,084 | B1 | 2/2017 | Vinciarelli | |
| 2024/0339920 | A1* | 10/2024 | Liu | H02M 1/0043 |
| 2026/0100654 | A1* | 4/2026 | Jin | H02M 3/158 |
| 2026/0112960 | A1* | 4/2026 | Inam | B60L 53/51 |

FOREIGN PATENT DOCUMENTS

| | | | |
|---|---|---|---|
| CN | 109391161 | A | 2/2019 |
| CN | 108233720 | B | 7/2019 |
| EP | 3852262 | A1 | 7/2021 |
| EP | 4089898 | A1 | 7/2021 |

OTHER PUBLICATIONS

Bin Su et al., Low conduction loss and low device stress three-level power factor correction rectifier, IET Power Electron, 2013, vol. 6, Iss. 3, pp. 478-487.

Priya Singh Bhakar et al., Fault-Tolerant and Self-Reliant Characteristic in Series Resonant Converter for Semiconductor Open/Short-Circuit Faults, IEEE, 2022, pp. 1143-1153.

* cited by examiner

*Primary Examiner* — Adolf D Berhane
(74) *Attorney, Agent, or Firm* — KIRTON McCONKIE; Evan R. Witt

(57) ABSTRACT

A coordinated fault-tolerant control method for a two-stage power module is provided. The two-stage power module includes a front-stage circuit and a rear-stage circuit. The front-stage circuit has a DC midpoint. Each of a first side circuit and a second side circuit of the rear-stage circuit includes two rear-stage switch sets. If one switch in one of the two rear-stage switch sets in the first side circuit fails, disable the other switch in the rear-stage switch set. Operate the other rear-stage switch set in the first side circuit normally. One of the two rear-stage switch sets in the second side circuit is operated normally, and the other of the two rear-stage switch sets in the second side circuit is disabled.

20 Claims, 23 Drawing Sheets

3

COORDINATED FAULT-TOLERANT CONTROL METHOD

CROSS-REFERENCE TO RELATED APPLICATION

This application claims priority to China Patent Application No. 202310800662.6, filed on Jun. 30, 2023, the entire contents of which are incorporated herein by reference for all purposes.

FIELD OF THE INVENTION

The present disclosure relates to a power conversion technology, and more particularly to a coordinated fault-tolerant control method for a two-stage power module.

BACKGROUND OF THE INVENTION

As known, solid-state transformers (SST) have been widely used in DC power consumption or DC power generation fields such as data centers, electric vehicle charging and swapping stations, photovoltaic products and energy storage products. It is important to provide the solid-state transformer with high reliability. In the process of designing the solid-state transformer, an appropriate fault-tolerant control method should be adopted to minimize the downtime caused by internal equipment failures.

Generally, the switch failure is a main failure cause of the power electronic circuit. When the switch fails, a fault-tolerant control method can be performed to reduce the system downtime. Consequently, the reliability can be enhanced, and the operation and maintenance cost will be reduced.

Conventionally, two fault-tolerant control methods were used. In accordance with the first fault-tolerant control method, the control circuit bypasses the faulty power module when the switch of the power module fails. Since it is necessary to bypass the whole power module as long as one switch fails, the power that can be provided by the system is reduced, and the fault tolerance is insufficient.

In accordance with the second fault-tolerant control method, the redundant components are arranged. When the switch failure occurs in the power module, the redundant components are used to reconstruct the circuit topology. However, since the second method needs to add redundant components, the circuitry complexity and the cost of the power module increase.

Therefore, there is a need of providing a coordinated fault-tolerant control method in order to overcome the drawbacks of the conventional technologies.

SUMMARY OF THE INVENTION

The present disclosure provides a coordinated fault-tolerant control method. The coordinated fault-tolerant control method is applied to the two-stage power module. In case that one switch in one of the two rear-stage switch sets in the first side circuit of the rear-stage circuit fails, some rear-stage switch sets in the first side circuit and the second side circuit of the rear-stage circuit are still operated normally. Consequently, the two-stage power module is maintained in the normal working state, the fault tolerance capability of the two-stage power module is enhanced, and the reliability of the two-stage power module is increased. Moreover, since it is not necessary to add any redundant components to realize the fault-tolerant operation of the two-stage power module, the circuitry complexity of the two-stage power module is reduced, and the cost of the two-stage power module is also reduced. Moreover, if any switch in the front-stage circuit fails and the DC midpoint is in a potential unbalance state, the DC midpoint is controlled to be in the potential balance state. Consequently, the DC bus voltage can be maintained in the balance state.

In accordance with an aspect of the present disclosure, a coordinated fault-tolerant control method for a two-stage power module is provided. The two-stage power module includes a front-stage circuit and a rear-stage circuit. The front-stage circuit has a DC midpoint. Each of a first side circuit and a second side circuit of the rear-stage circuit includes two rear-stage switch sets. Each of the rear-stage switch sets includes two switches in serial connection. The control signals for controlling the two switches are complementary to each other. The coordinated fault-tolerant control method includes the following steps. When one switch in one of the two rear-stage switch sets in the first side circuit of the rear-stage circuit fails, the other switch in the rear-stage switch set with the failed switch is disabled. The other rear-stage switch set in the first side circuit of the rear-stage circuit is controlled to be operated normally. Then, one of the two rear-stage switch sets in the second side circuit of the rear-stage circuit is controlled to be operated normally, and the other of the two rear-stage switch sets in the second side circuit of the rear-stage circuit is disabled. When any switch in the front-stage circuit fails and the DC midpoint is in a potential unbalance state, the DC midpoint is controlled to be in a potential balance state.

In accordance with another aspect of the present disclosure, a coordinated fault-tolerant control method for a power system is provided. The power system includes a plurality of two-stage power modules. Each of the plurality of two-stage power modules includes a front-stage circuit and a rear-stage circuit. The front-stage circuit has a DC midpoint. Each of a first side circuit and a second side circuit of the rear-stage circuit includes two rear-stage switch sets. Each of the rear-stage switch sets includes two switches in serial connection. The control signals for controlling the two switches are complementary to each other. The front-stage circuits of the plurality of two-stage power modules are connected with each other in series. The rear-stage circuits of the plurality of two-stage power modules are connected with each other in parallel. The coordinated fault-tolerant control method includes the following steps. When one switch in one of the two rear-stage switch sets in the first side circuit of the rear-stage circuit in a specified two-stage power module of the plurality of two-stage power modules fails, the other switch in the rear-stage switch set with the failed switch is disabled. Then, the other rear-stage switch set in the first side circuit of the rear-stage circuit in the specified two-stage power module is controlled to be operated normally. Then, one of the two rear-stage switch sets in the second side circuit of the rear-stage circuit in the specified two-stage power module is controlled to be operated normally, and the other of the two rear-stage switch sets in the second side circuit of the rear-stage circuit is disabled. When any switch in the front-stage circuit in any two rear-stage switch fails and the DC midpoint is in a potential unbalance state, the DC midpoint in the specified two-stage power module is controlled to be in a potential balance state.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
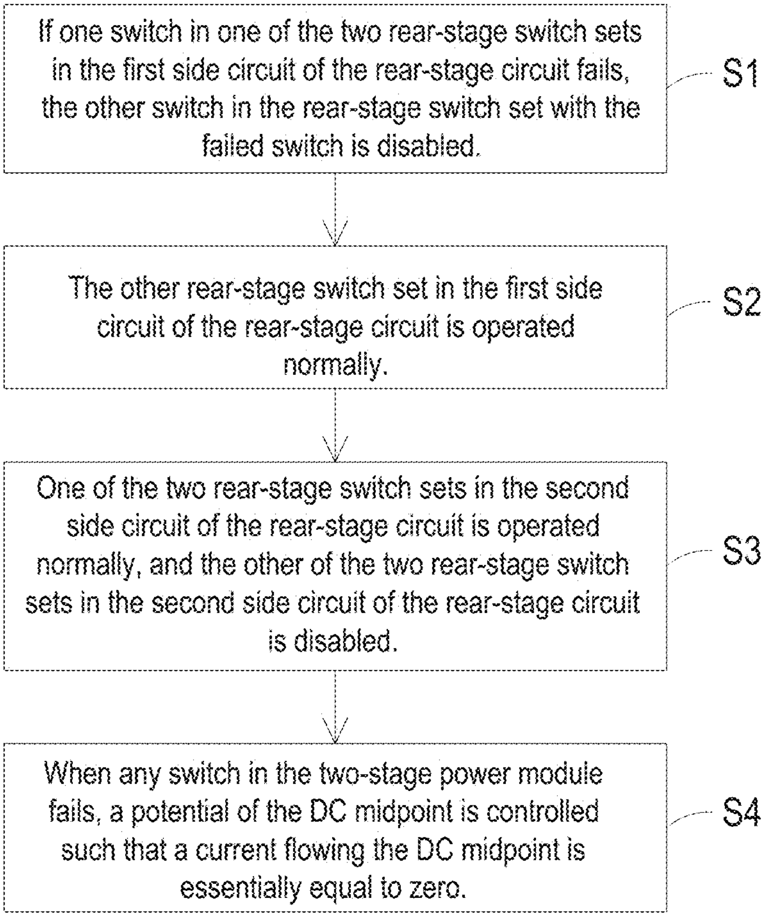
FIG. 1 is a flowchart illustrating a coordinated fault-tolerant control method according to a first embodiment of the present disclosure.
Figure 2A:
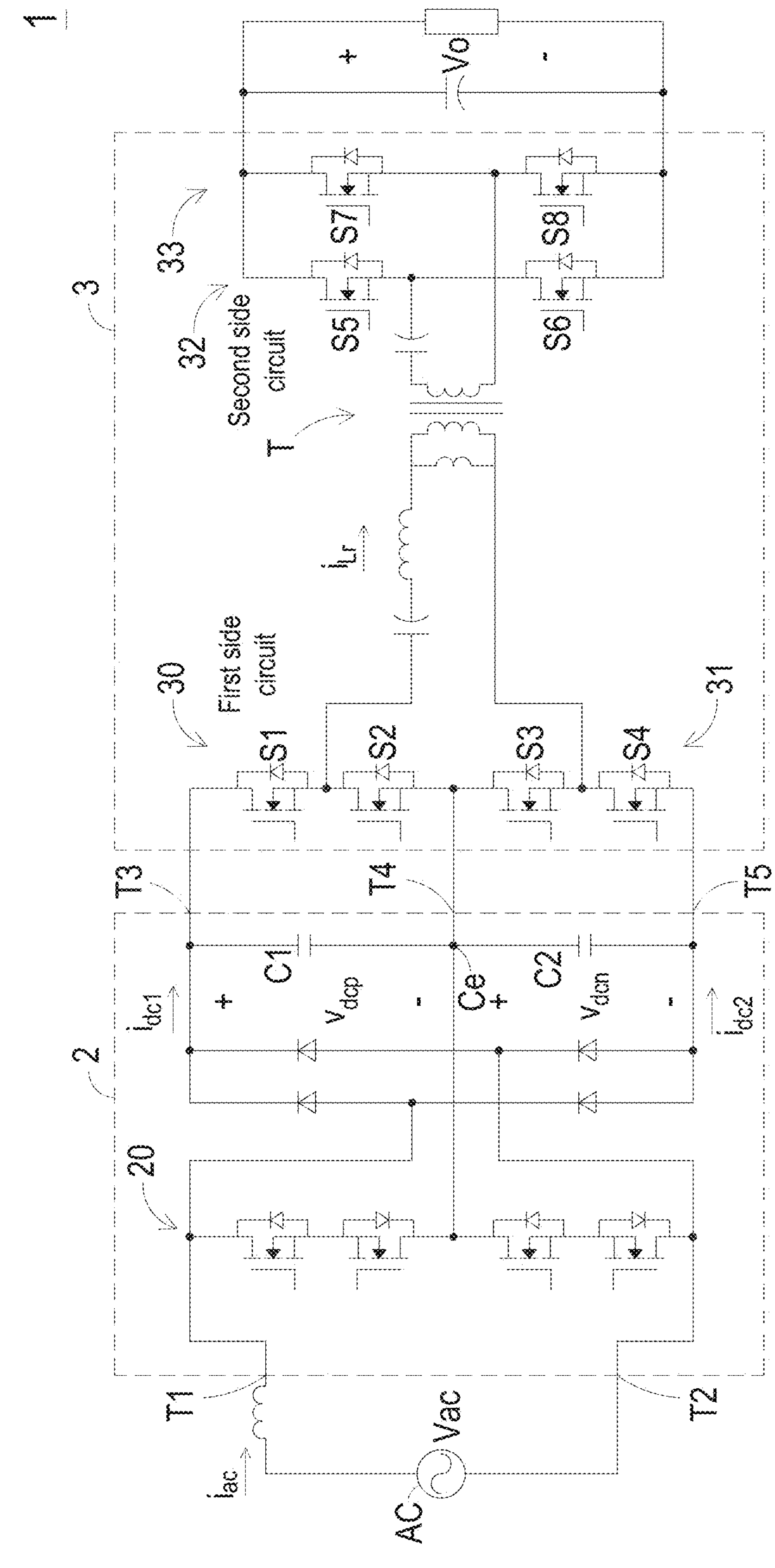
FIG. 2A is a schematic circuit diagram illustrating an exemplary two-stage power module using the coordinated fault-tolerant control method as shown in FIG. 1.
Figure 2B:
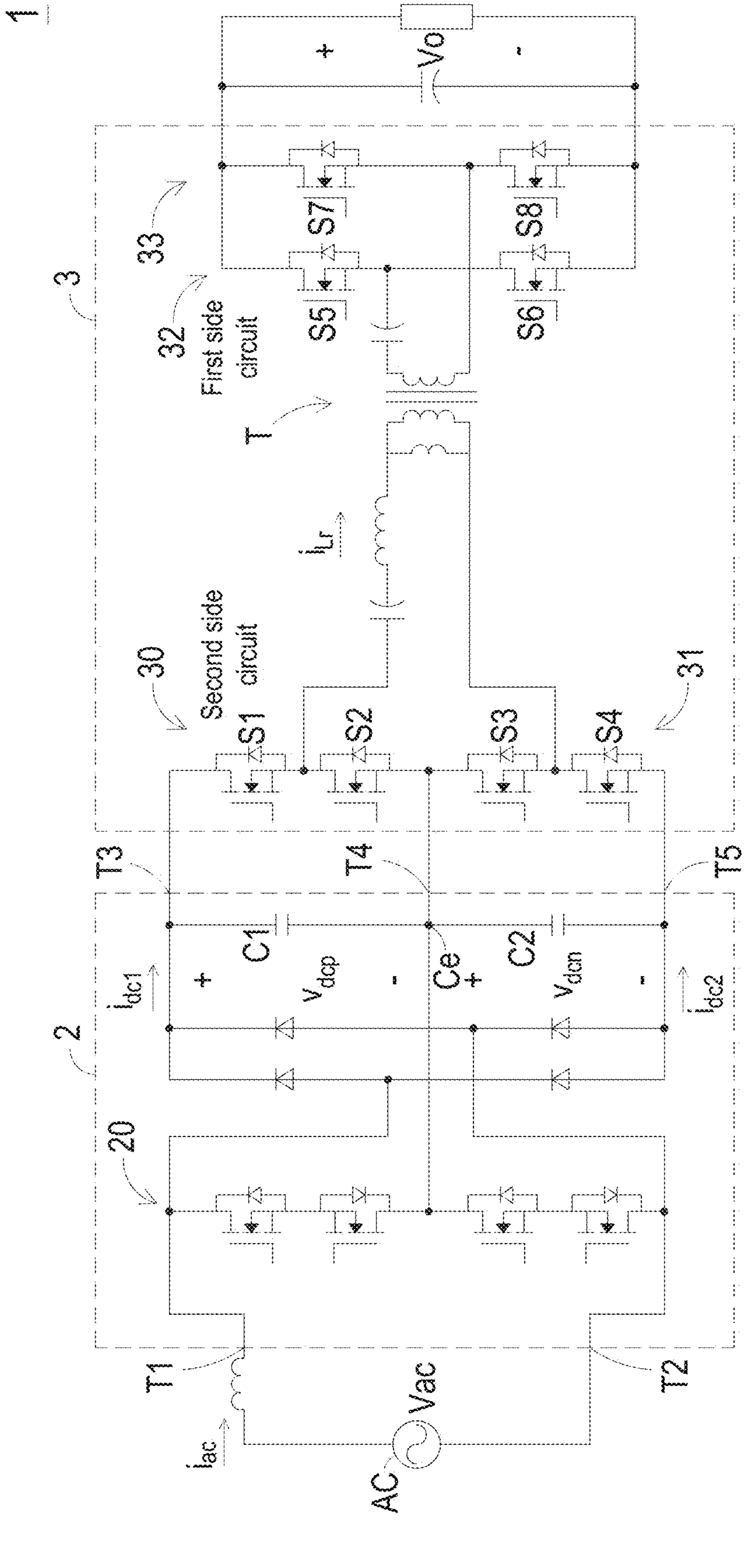
FIG. 2B is a schematic circuit diagram illustrating another exemplary two-stage power module using the coordinated fault-tolerant control method as shown in FIG. 1.

Please refer to FIGS. 1, 2A and 2B. FIG. 1 is a flowchart illustrating a coordinated fault-tolerant control method according to a first embodiment of the present disclosure. FIG. 2A is a schematic circuit diagram illustrating an exemplary two-stage power module using the coordinated fault-tolerant control method as shown in FIG. 1. FIG. 2B is a schematic circuit diagram illustrating another exemplary two-stage power module using the coordinated fault-tolerant control method as shown in FIG. 1. The coordinated fault-tolerant control method of FIG. 1 can be applied to the controller (not shown) in the two-stage power module of FIG. 2A or the two-stage power module of FIG. 2B.

The two-stage power module 1 includes a front-stage circuit 2 and a rear-stage circuit 3. The front-stage circuit 2 has a DC midpoint Ce. The rear-stage circuit 3 includes a first side circuit, a second side circuit and a transformer T.

In the example of FIG. 2A, the first side circuit of the rear-stage circuit 3 is electrically connected between the front-stage circuit 2 and a primary winding of the transformer T. The first side circuit of the rear-stage circuit 3 includes two rear-stage switch sets, i.e., a first rear-stage switch set 30 and a second rear-stage switch set 31. The first rear-stage switch set 30 and the second rear-stage switch set 31 are connected with each other in series. The second side circuit of the rear-stage circuit 3 is electrically connected with a secondary winding of the transformer T. The second side circuit of the rear-stage circuit 3 includes two rear-stage switch sets, i.e., a third rear-stage switch set 32 and a fourth rear-stage switch set 33. The third rear-stage switch set 32 and the fourth rear-stage switch set 33 are connected with each other in parallel.

In the example of FIG. 2B, the second side circuit of the rear-stage circuit 3 is electrically connected between the front-stage circuit 2 and a primary winding of the transformer. The second side circuit of the rear-stage circuit 3 includes two rear-stage switch sets, i.e., a first rear-stage switch set 30 and a second rear-stage switch set 31. The first rear-stage switch set 30 and the second rear-stage switch set 31 are connected with each other in series. The first side circuit of the rear-stage circuit 3 is electrically connected with a secondary winding of the transformer T. The first side circuit of the rear-stage circuit 3 includes two rear-stage switch sets, i.e., a third rear-stage switch set 32 and a fourth rear-stage switch set 33. The third rear-stage switch set 32 and the fourth rear-stage switch set 33 are connected with each other in parallel.

Each of the four switch sets includes two switches. The control signals for controlling the two switches in each switch set are complementary to each other. In this context, these two switches are referred to as two complementary switches.

The first rear-stage switch set 30 includes a first switch S1 and a second switch S2. The second rear-stage switch set 31 includes a third switch S3 and a fourth switch S4. The third rear-stage switch set 32 includes a fifth switch S5 and a sixth switch S6. The fourth rear-stage switch set 33 includes a seventh switch S7 and an eighth switch S8.

In the rear-stage circuit 3, one of the first side circuit and the second side circuit is operated in an inverter mode, and the other of the first side circuit and the second side circuit is operated in a rectifier mode. In a first situation, the first side circuit is an inverter circuit operated in the inverter mode, and the second side circuit is a rectifier circuit operated in the rectifier mode. In a second situation, the first side circuit is a rectifier circuit operated in the rectifier mode, and the second side circuit is an inverter circuit operated in the inverter mode.

As shown in FIG. 1, the coordinated fault-tolerant control method includes the following steps. The coordinated fault-tolerant control method is applied to the two-stage power module 1 as shown in FIG. 2A. The coordinated fault-tolerant control method for the two-stage power module 1 as shown in FIG. 2B is similar, and not redundantly described herein.

In a step S1, if one switch in one of the two rear-stage switch sets in the first side circuit of the rear-stage circuit 3 (e.g., the first rear-stage switch set 30 or second rear-stage switch set 31) fails (e.g., the open-circuited failure occurs), the other switch (i.e., a normal switch) in the rear-stage switch set with the failed switch is in the close state (e.g., in the continuous conduction state). Under this circumstance, the normal switch is similar to a conductor line and not operated at the high switching frequency.

In a step S2, the other rear-stage switch set in the first side circuit of the rear-stage circuit 3 (i.e., the normal switch set) is operated normally. That is, the normal switch set is operated at the high-frequency switching to obtain the required voltage and current.

In a step S3, one of the two rear-stage switch sets in the second side circuit of the rear-stage circuit 3 (e.g., the third rear-stage switch set 32 or the fourth rear-stage switch set 33) is operated normally, and the other of the two rear-stage switch sets in the second side circuit of the rear-stage circuit 3 is disabled. For example, the rear-stage switch set is disabled so that the rear-stage switch set doesn't operated at the high-frequency switching. In other words, one of the two rear-stage switch sets in the second side circuit of the rear-stage circuit 3 is operated at the high-frequency switching to obtain required voltage and current, and the other of the two rear-stage switch sets in the second side circuit of the rear-stage circuit 3 doesn't be operated at the high-frequency switching. In one or more embodiments, one switch of the other rear-stage switch set is constant on and is like a conductor line, and the other switch is constant off. Consequently, the circuitry topology of the two rear-stage switch sets in the second side circuit of the rear-stage circuit 3 is switched from the full-bridge circuitry topology to the half-bridge circuitry topology.

In a step S4, when any switch in the two-stage power module 1 fails, a potential of the DC midpoint Ce is controlled such that a current flowing the DC midpoint Ce is essentially equal to zero.

In an embodiment, the two-stage power module 1 includes a controller, and the steps S1~S4 are performed by the controller. In another embodiment, the two-stage power module 1 includes a front-stage controller and a rear-stage controller. The steps S1~S3 are operated by the rear-stage controller. The step S4 is performed by the front-stage controller.

Please refer to FIGS. 1 and 2A again. It is assumed that the first switch S1 in the first side circuit of the rear-stage circuit 3 fails (e.g., the open-circuited failure occurs). The controller is configured to control the second switch S2 disabled (i.e., in the constant on state), and to operate the third switch S3 and the fourth switch S4 at the high-frequency switching. The controller is further configured to operate the fifth switch S5 and the sixth switch S6 in the second side circuit of the rear-stage circuit 3 at the high-frequency switching, and to control the seventh switch S7 and the eighth switch S8 in the second side circuit of the rear-stage circuit 3 disabled. Alternatively, under control of the controller, the seventh switch S7 and the eighth switch S8 in the second side circuit of the rear-stage circuit 3 are operated at the high-frequency switching, and the fifth switch S5 and the sixth switch S6 in the second side circuit of the rear-stage circuit 3 are disabled.

In some embodiments, disable one switch is that the switch doesn't be operated at the high-frequency switching. For example, the switch disabled is constant on or off, and when the switch is constant on, the switch is like a conductor line.

In case that the second switch S2, the third switch S3 or the fourth switch S4 in the first side circuit of the rear-stage circuit 3 fails, the control method is similar to that mentioned above, and not redundantly described herein.

Please refer to FIGS. 1 and 2B again. It is assumed that the fifth switch S5 in the first side circuit of the rear-stage circuit 3 fails (e.g., the open-circuited failure occurs). Under control of the controller, the sixth switch S6 is disabled (e.g., in the constant on state), and the seventh switch S7 and the eighth switch S8 are operated at the high-frequency switching. Under control of the controller, the first switch S1 and the second switch S2 in the second side circuit of the rear-stage circuit 3 are operated at the high-frequency switching, and the third switch S3 and the fourth switch S4 in the second side circuit of the rear-stage circuit 3 are disabled (i.e., not operated at the high-frequency switching). Alternatively, under control of the controller, the third switch S3 and the fourth switch S4 in the second side circuit of the rear-stage circuit 3 are operated at the high-frequency switching, and the first switch S1 and the second switch S2 in the second side circuit of the rear-stage circuit 3 are disabled (i.e., not operated at the high-frequency switching).

In case that the sixth switch S6, the seventh switch S7 and the eighth switch S8 in the first side circuit of the rear-stage circuit 3 fails, the control method is similar to that mentioned above, and not redundantly described herein.

In the above embodiments, the switch failure may be the open-circuited failure of a switch. In some other embodiments, the switch failure may be a converted open-circuited failure. For example, in case that the switch is equipped with a quick acting fuse, the short-circuited failure can be converted into the open-circuited failure.

In the above embodiments, the two-stage power module 1 uses the coordinated fault-tolerant control method. In case that one switch in one of the two rear-stage switch sets in the first side circuit of the rear-stage circuit 3 fails, some rear-stage switch sets in the first side circuit and the second side circuit of the rear-stage circuit 3 are still operated normally. Consequently, the two-stage power module 1 is maintained in the normal working state, the fault tolerance capability of the two-stage power module 1 is enhanced, and the reliability of the two-stage power module 1 is increased. Moreover, since it is not necessary to add any redundant components to realize the fault-tolerant operation of the two-stage power module 1, the circuitry complexity of the two-stage power module 1 is reduced, and the cost of the two-stage power module 1 is also reduced.

Moreover, if any switch in the two-stage power module 1 fails to cause the potential of the DC midpoint Ce unbalance, the potential of the DC midpoint Ce is controlled to be regained balance. Consequently, the DC bus voltage can be maintained in the balance state.

In some embodiments, the front-stage circuit 2 further includes a first AC terminal T1, a second AC terminal T2, a front-stage power conversion unit 20, a first capacitor C1, a second capacitor C2, a first DC terminal T3, a second DC terminal T4 and a third DC terminal T5. The first AC terminal T1 and the second AC terminal T2 are connected with an AC power source.

The front-stage power conversion unit 20 includes a first bridge arm and a second bridge arm. The first bridge arm and the second bridge arm are electrically connected between the first AC terminal T1 and the second AC terminal T2. The first capacitor C1 is electrically connected between the first DC terminal T3 and the DC midpoint Ce. The second capacitor C2 is electrically connected between the DC midpoint Ce and the third DC terminal T5. The second DC terminal T4 is electrically connected with the DC midpoint Ce.

In the embodiment of FIG. 2A, the front-stage circuit 2 is a three-level high power factor converter (HPFC), and the inverter circuit of the rear-stage circuit 3 is a serial half bridge (SHB) inverter circuit. It is noted that the type of the front-stage circuit 2 and the type of the inverter circuit of the rear-stage circuit 3 are not restricted.

FIGS. 3A, 3B, 3C, 3D and 3E are schematic circuit diagrams illustrating some variant examples of the front-stage circuit in the two-stage power module as shown in FIG. 2A or FIG. 2B.

Figure 3A:
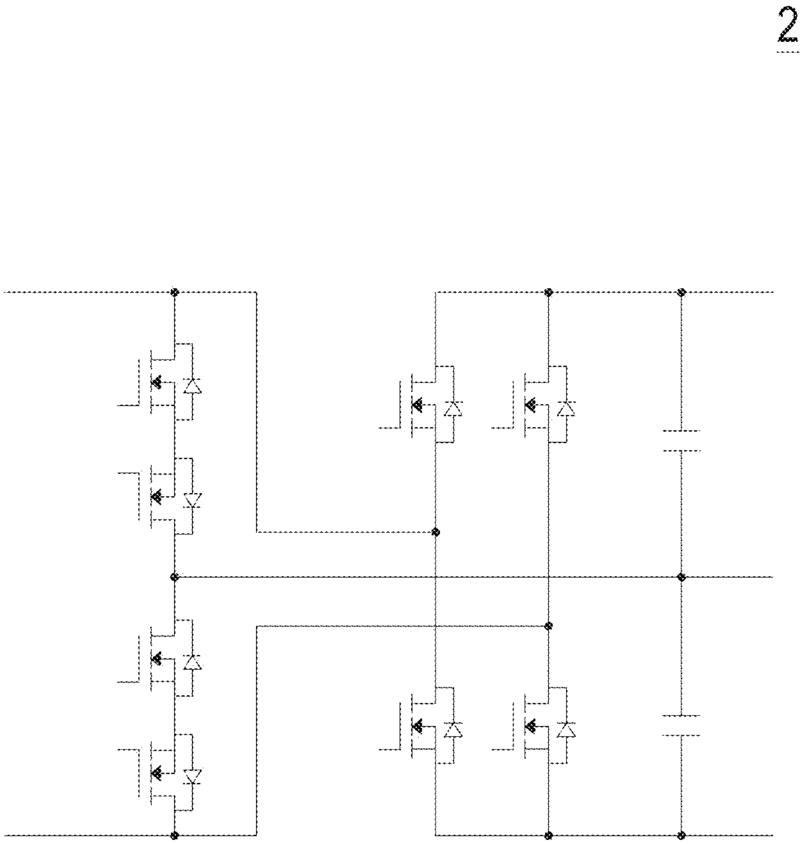
FIGS. 3A, 3B, 3C, 3D and 3E are schematic circuit diagrams illustrating some variant examples of the front-stage circuit in the two-stage power module as shown in FIG. 2A or FIG. 2B.

In the embodiment of FIG. 3A, the front-stage circuit 2 is a T-type three-level converter.

Figure 3B:
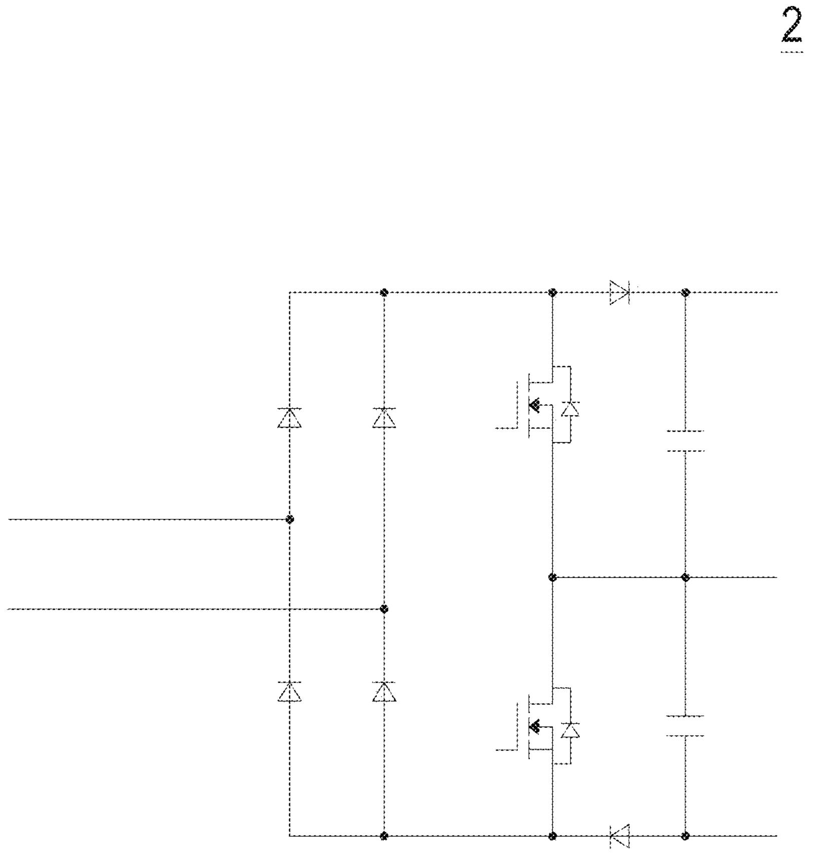

In the embodiment of FIG. 3B, the front-stage circuit 2 is a three-level high power factor converter (HPFC).

Figure 3C:
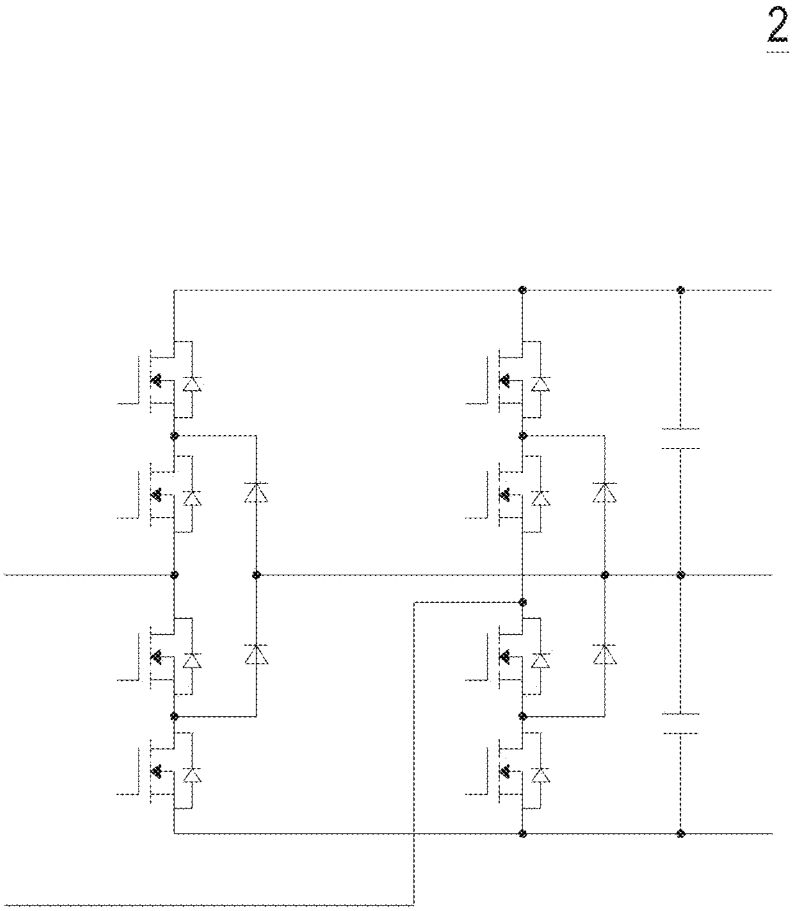

In the embodiment of FIG. 3C, the front-stage circuit 2 is a diode neutral point clamped converter (DNPC).

Figure 3D:
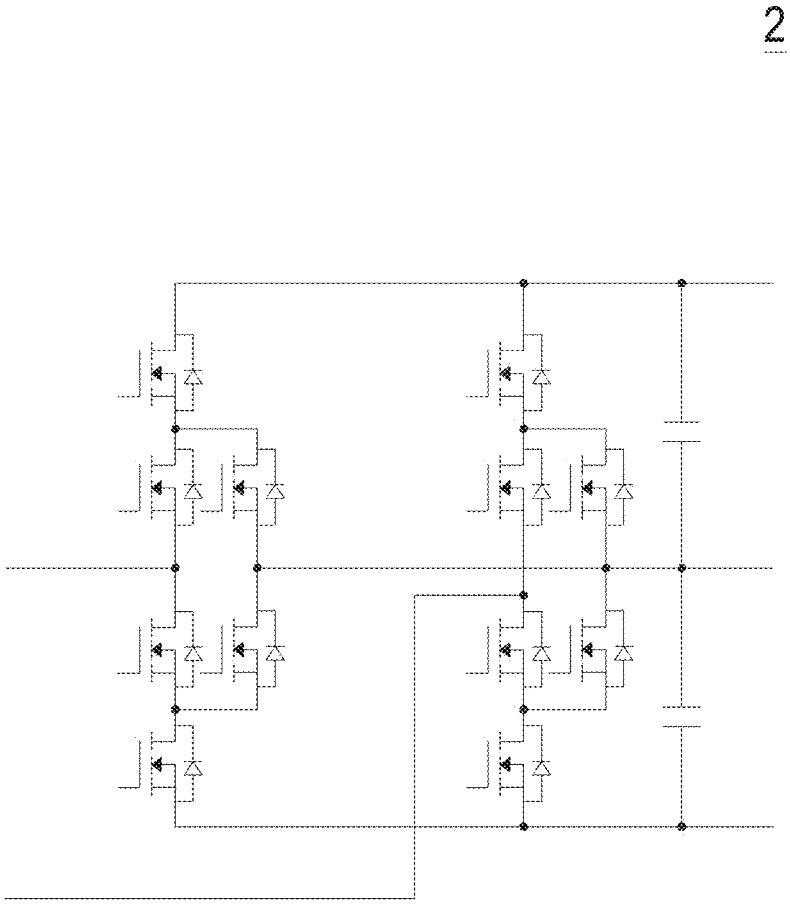

In the embodiment of FIG. 3D, the front-stage circuit 2 is an active-neutral-point clamped converter (ANPC).

Figure 3E:
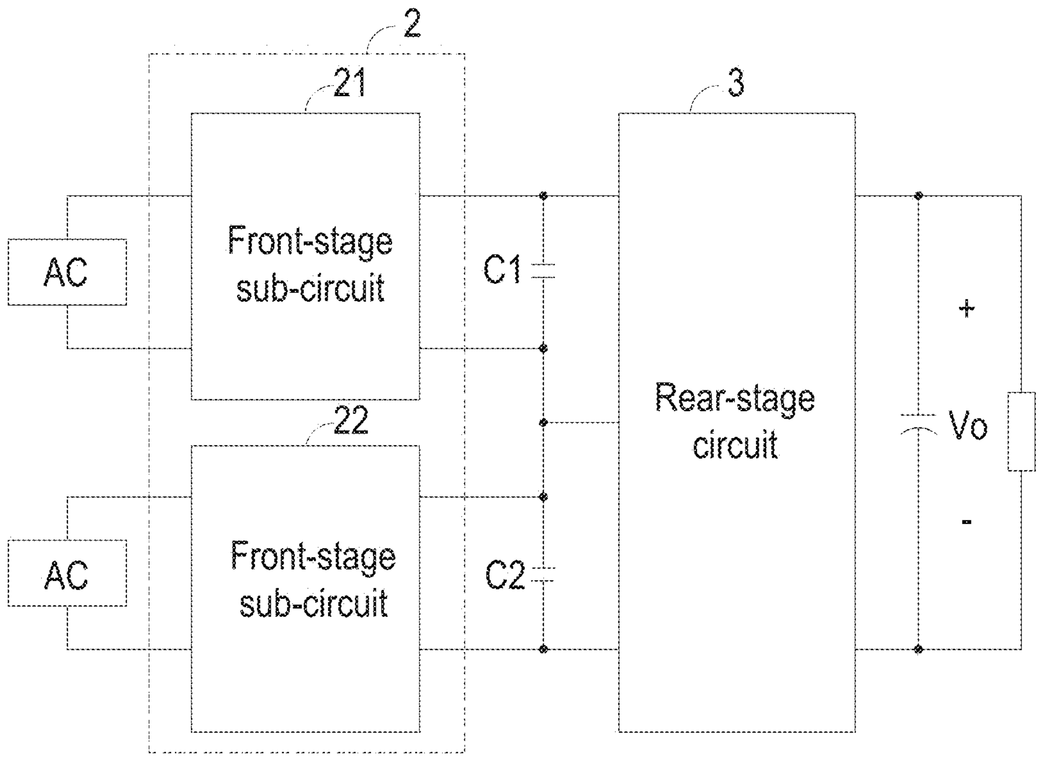

In the embodiment of FIG. 3E, the front-stage circuit 2 includes two front-stage sub-circuits 21 and 22.

The front-stage circuit 2 may be further modified as long as the neutral point balance control can be realized, thereby controlling the current flowing the bus capacitor corresponding to the fault bridge arm to be equal to zero.

FIGS. 4A, 4B, 4C and 4D are schematic circuit diagrams illustrating some variant examples of the first side circuit of the rear-stage circuit shown in FIG. 2A or the second side circuit of the rear-stage circuit shown in FIG. 2B.

Figure 4A:
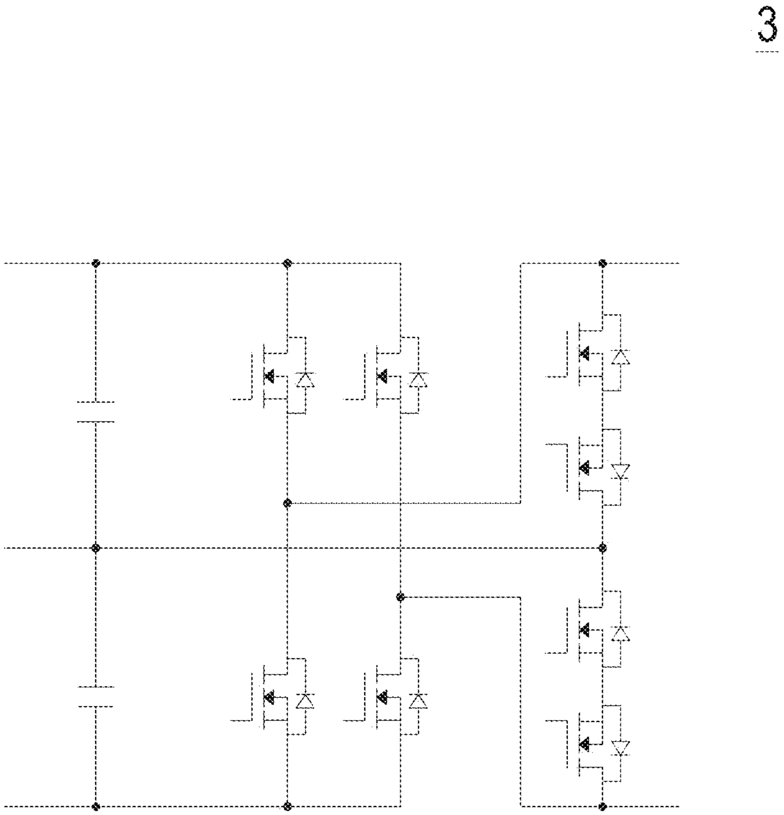
FIGS. 4A, 4B, 4C and 4D are schematic circuit diagrams illustrating some variant examples of the first side circuit of the rear-stage circuit shown in FIG. 2A or the first side circuit of the rear-stage circuit shown in FIG. 2B.

In the embodiment of FIG. 4A, the first side circuit of the rear-stage circuit 3 shown in FIG. 2A or the second side circuit of the rear-stage circuit 3 shown in FIG. 2B is a T-type three-level converter.

Figure 4B:
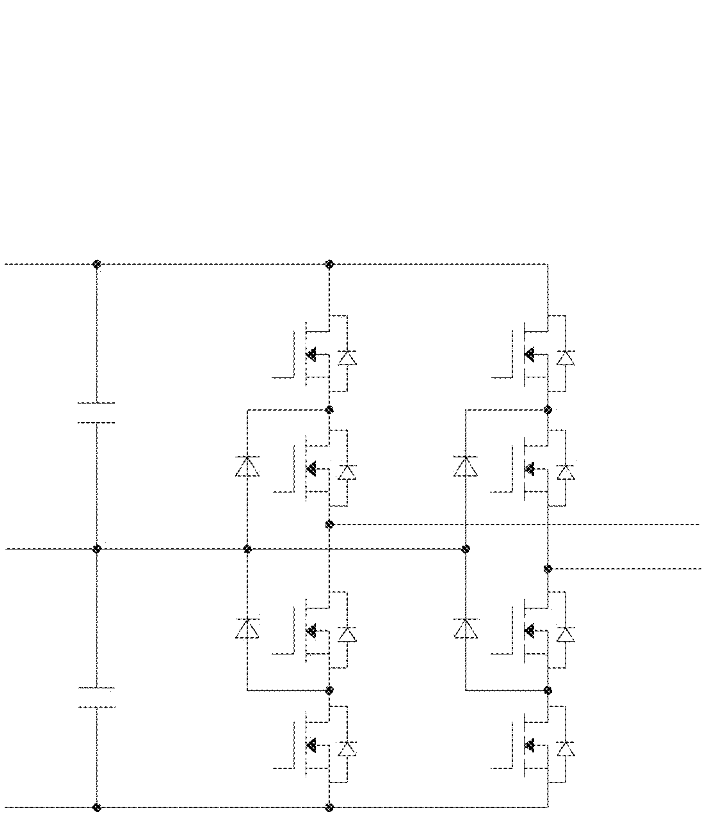

In the embodiment of FIG. 4B, the first side circuit of the rear-stage circuit 3 shown in FIG. 2A or the second side circuit of the rear-stage circuit 3 shown in FIG. 2B is a diode neutral point clamped converter (DNPC).

Figure 4C:
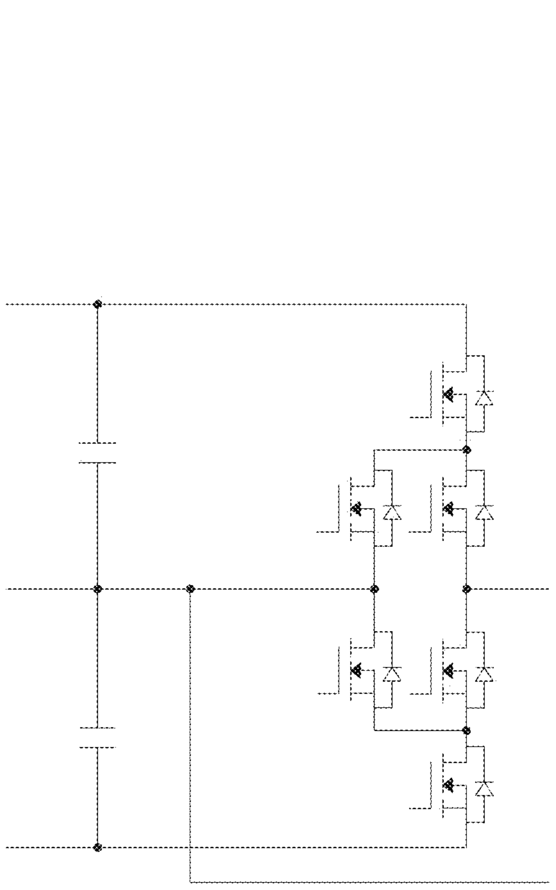

In the embodiment of FIG. 4C, the first side circuit of the rear-stage circuit 3 shown in FIG. 2A or the second side circuit of the rear-stage circuit 3 shown in FIG. 2B is an active-neutral-point clamped half bridge converter.

Figure 4D:
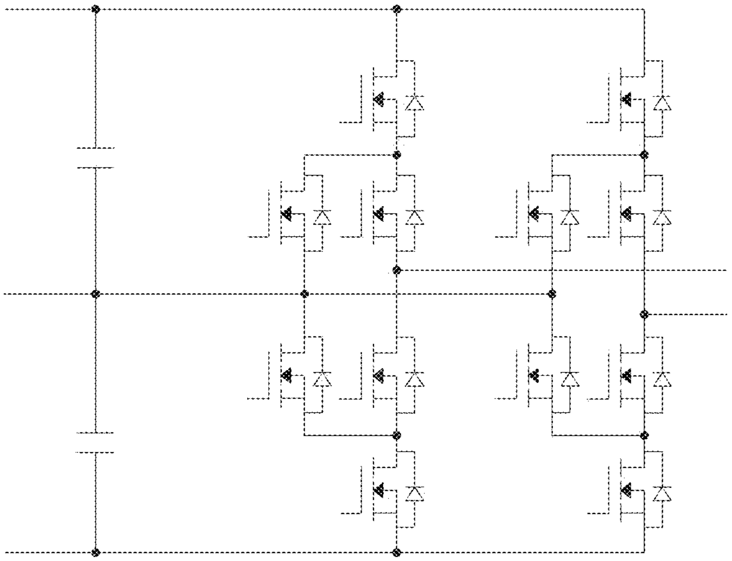

In the embodiment of FIG. 4D, the first side circuit of the rear-stage circuit 3 shown in FIG. 2A or the second side circuit of the rear-stage circuit 3 shown in FIG. 2B is an active-neutral-point clamped converter (ANPC).

Figure 5A:
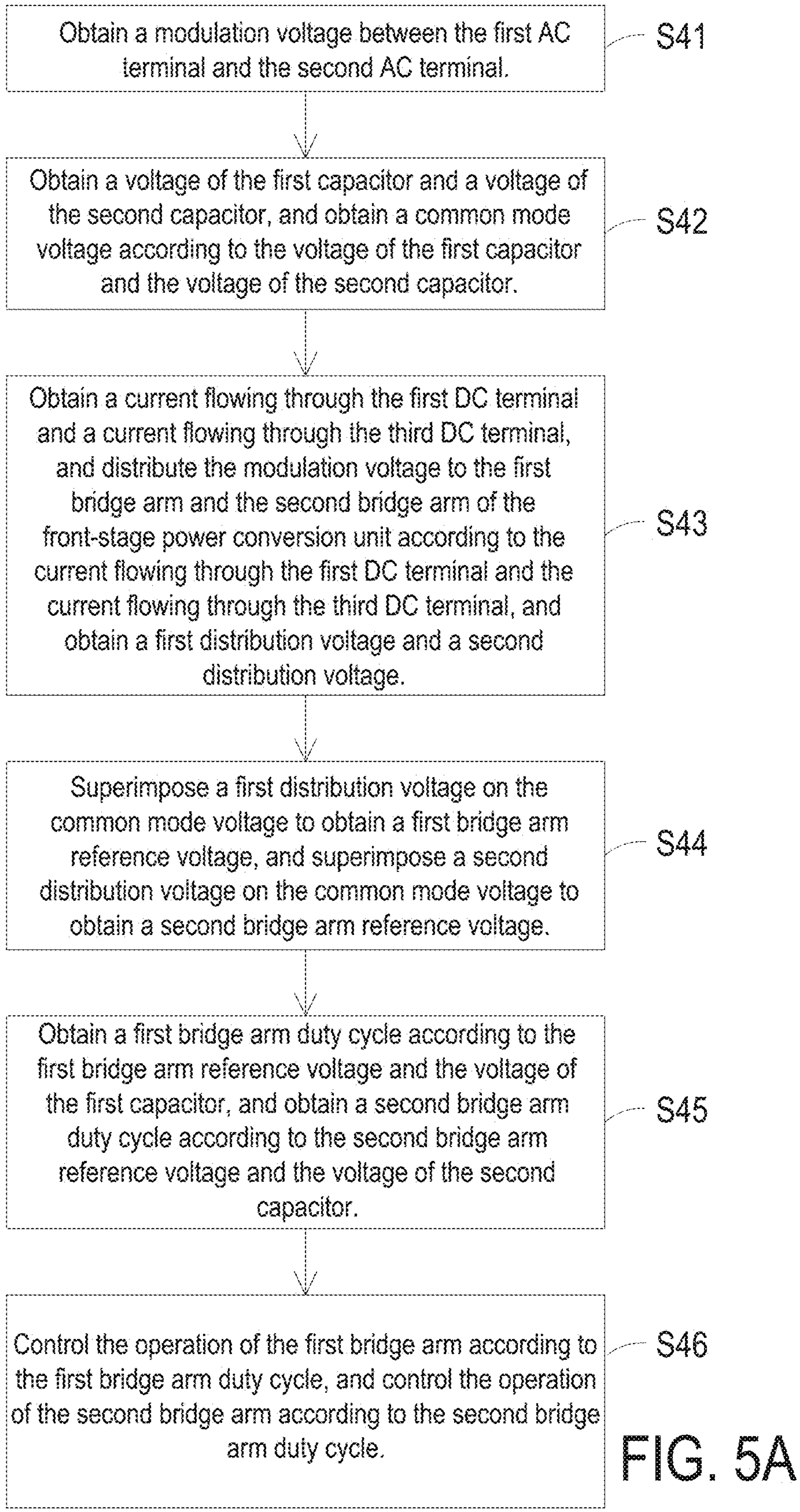
FIG. 5A is a flowchart illustrating a midpoint balance control process in the coordinated fault-tolerant control method of FIG. 1.
Figure 5B:
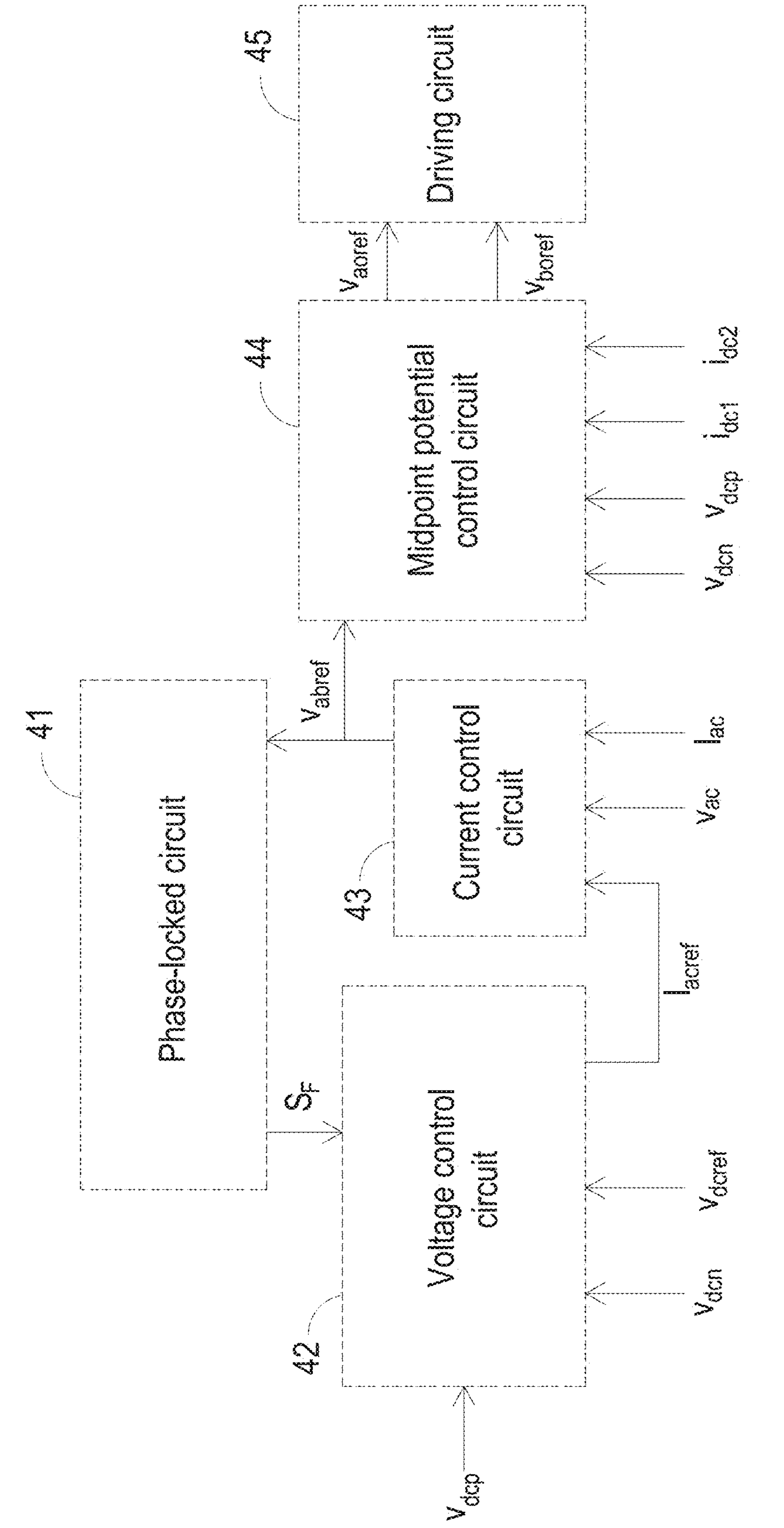
FIG. 5B is a schematic block diagram illustrating a control mechanism of the front-stage circuit in the power module of FIG. 2A.
Figure 5C:
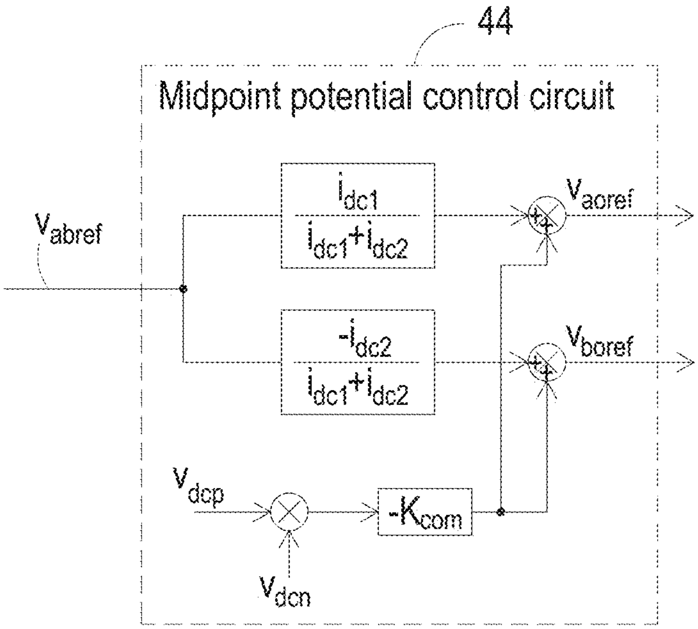
FIG. 5C is a schematic circuit diagram illustrating the midpoint voltage control circuit shown in FIG. 5B.

Taking the two-stage power module of FIG. 2A as an example, a midpoint balance control process for the three-level front-stage circuit is explained as follows. FIG. 5A is a flowchart illustrating a midpoint balance control process in the coordinated fault-tolerant control method of FIG. 1. FIG. 5B is a schematic block diagram illustrating a control mechanism of the front-stage circuit in the power module of FIG. 2A. FIG. 5C is a schematic circuit diagram illustrating the midpoint voltage control circuit of FIG. 5B.

In one or more embodiments, the midpoint balance control process in the coordinated fault-tolerant control method of FIG. 1 includes the following steps.

In a step S41, obtain a modulation voltage between the first AC terminal T1 and the second AC terminal T2.

In a step S42, obtain a voltage of the first capacitor C1 and a voltage of the second capacitor C2, and obtain a common mode voltage according to the voltage of the first capacitor C1 and the voltage of the second capacitor C2.

In a step S43, obtain a current flowing through the first DC terminal T3 and a current flowing through the third DC terminal T5, distribute the modulation voltage to the first bridge arm and the second bridge arm of the front-stage power conversion unit 20 according to the current flowing through the first DC terminal T3 and the current flowing through the third DC terminal T5, and obtain a first distribution voltage and a second distribution voltage.

In a step S44, superimpose a first distribution voltage on the common mode voltage to obtain a first bridge arm reference voltage, and superimpose a second distribution voltage on the common mode voltage to obtain a second bridge arm reference voltage.

In a step S45, obtain a first bridge arm duty cycle according to the first bridge arm reference voltage and the voltage of the first capacitor C1, and obtain a second bridge arm duty cycle according to the second bridge arm reference voltage and the voltage of the second capacitor C2.

In a step S46, control the operation of the first bridge arm according to the first bridge arm duty cycle, and control the operation of the second bridge arm according to the second bridge arm duty cycle. Consequently, make the potential of the DC midpoint Ce balance.

As shown in FIG. 5B, the control mechanism of the front-stage circuit includes a phase-locked circuit 41, a voltage control circuit 42, a current control circuit 43, a midpoint potential control circuit 44 and a driving circuit 45.

Please refer to FIGS. 5A and 5B. The step S41 is performed. The phase-locked circuit 41 is configured to lock a modulation voltage $v_{abref}$ between the first AC terminal T1 and the second AC terminal T2 to obtain a feedback signal Sr. The voltage control circuit 42 is configured to receive a voltage $v_{dcp}$ of the first capacitor C1, a voltage $v_{dcn}$ of the second capacitor C2, a bus voltage reference value $v_{acref}$ and the feedback signal Sr. The voltage control circuit 42 is further configured to subtract a bus voltage from the bus voltage reference value $v_{dcref}$, to generate a first error signal. The sum of the voltage $v_{dcp}$ of the first capacitor C1 and the voltage $v_{dcn}$ of the second capacitor C2 is the bus voltage. The voltage control circuit 42 is further configured to adjust the first error signal to obtain a first reference signal. The voltage control circuit 42 is further configured to superimpose the first reference signal on the feedback signal $S_F$, to obtain an AC current reference value $I_{acref}$. The current control circuit 43 is configured to receive an AC current $I_{ac}$, the AC current reference value $I_{acref}$ and an AC voltage $v_{ac}$. The current control circuit 43 is further configured to subtract the AC current $I_{ac}$ from the AC current reference value $I_{acref}$, to generate a second error signal. The current control circuit 43 is further configured to adjust the second error signal to obtain a second reference signal. The current control circuit 43 is further configured to subtract the second reference signal from the AC voltage $v_{ac}$, to obtain the modulation voltage $v_{abref}$.

The midpoint potential control circuit 44 is configured to receive the voltage $v_{dcp}$ of the first capacitor C1, the voltage $v_{dcn}$ of the second capacitor C2, the modulation voltage $v_{abref}$, a current $i_{dc1}$ flowing through the first DC terminal T3 and a current $i_{dc2}$ flowing through the third DC terminal T5.

Please refer to FIGS. 5A, 5B and 5C. The step S42 is performed. The midpoint potential control circuit 44 is further configured to calculate a difference between the voltage $v_{dcp}$ of the first capacitor C1 and the voltage $v_{dcn}$ of the second capacitor C2, and to regulate the difference to obtain the common mode voltage $v_{com}$. Consequently, the common mode voltage $v_{com}$ is obtained according to the formula: $v_{com}=(v_{ao}+v_{bo})/2$, where $v_{ao}$ is the first distribution voltage, and $v_{bo}$ is the second distribution voltage.

Please refer to FIGS. 5A, 5B and 5C. The step S43 is performed. The midpoint potential control circuit 44 is further configured to calculate the first distribution voltage $v_{ao}$ and the second distribution voltage $v_{bo}$. The first distribution voltage $v_{ao}$ and the second distribution voltage $v_{bo}$ are calculated according to the following mathematic formulae:

$$v_{ao} = \frac{i_{dc1}}{i_{dc1}+i_{dc2}} v_{abref}$$

$$v_{bo} = -\frac{i_{dc2}}{i_{dc1}+i_{dc2}} v_{abref}$$

Please refer to FIGS. 5A, 5B and 5C. The step S44 is performed. The midpoint potential control circuit 44 is further configured to superimpose the first distribution voltage $v_{ao}$ on the common mode voltage $v_{com}$ to obtain a first bridge arm reference voltage $v_{aoref}$, and to superimpose the second distribution voltage $v_{bo}$ on the common mode voltage $v_{com}$ to obtain a second bridge arm reference voltage $v_{boref}$.

Please refer to FIGS. 5A and 5B. The step S45 is performed. The driving circuit 45 is configured to obtain a first bridge arm duty cycle $d_1$ and a second bridge arm duty cycle de according to the AC current $I_{ac}$, the voltage $v_{dcp}$ of the first capacitor C1, the voltage $v_{dcn}$ of the second capacitor C2, the first bridge arm reference voltage $v_{aoref}$ and the second bridge arm reference voltage $v_{boref}$. The first bridge arm duty cycle $d_1$ and the second bridge arm duty cycle de are calculated according to the following formulae:

$$\begin{cases} d_1 = 1 - \dfrac{V_{aoref}}{v_{dcp}} = 1 - \dfrac{\frac{i_{dc1}}{i_{dc1}+i_{dc2}} v_{abref} + v_{com}}{v_{dcp}} \\ d_2 = 1 + \dfrac{V_{boref}}{v_{dcn}} = 1 - \dfrac{\frac{i_{dc2}}{i_{dc1}+i_{dc2}} v_{abref} - v_{com}}{v_{dcn}} \end{cases} \quad (i_{ac} > 0);$$

$$\begin{cases} d_1 = 1 + \dfrac{V_{aoref}}{v_{dcp}} = 1 + \dfrac{\frac{i_{dc1}}{i_{dc1}+i_{dc2}} v_{abref} + v_{com}}{v_{dcp}} \\ d_2 = 1 - \dfrac{V_{boref}}{v_{dcn}} = 1 + \dfrac{\frac{i_{dc2}}{i_{dc1}+i_{dc2}} v_{abref} - v_{com}}{v_{dcn}} \end{cases} \quad (i_{ac} < 0)$$

Please refer to FIGS. 5A and 5B again. The step S45 is performed. The driving circuit 45 is further configured to generate switch signals according to the first bridge arm duty cycle $d_1$ and the second bridge arm duty cycle de. The operations of the first bridge arm and the second bridge arm are controlled according to the switch signals.

In some embodiments, the steps S1~S3, the steps S41~S46 and the control architecture of FIG. 5B are performed by the controller of the two-stage power module 1. In some embodiments, the steps S1~S3 are performed by the rear-stage controller of the two-stage power module 1, and the steps S41~S46 and the control architecture of FIG. 5B are performed by the front-stage controller of the two-stage power module 1. The controller of the two-stage power module 1, the front-stage controller of the two-stage power module 1 or the rear-stage controller of the two-stage power module 1 may be implemented with a control chip. Alternatively, the controller of the two-stage power module 1, the front-stage controller of the two-stage power module 1 or the rear-stage controller of the two-stage power module 1 is implemented with a DSP control chip and a FPGA control chip. The DSP control chip is used for the signal sampling and loop control. For example, the functions of the phase-locked circuit, the voltage control circuit, the current control circuit and the midpoint potential control circuit may be achieved by the DSP control chip, and the function of signal modulation and generating the switch driving signals may be achieved by the FPGA control chip.

In some embodiments, the first bridge arm of the front-stage power conversion unit 20 includes a switch. In the embodiment of FIG. 2A or FIG. 2B, the first bridge arm of the front-stage power conversion unit 20 includes two switches in serial connection, and the two switches are complementary to each other. Moreover, in the step S46, the operations of the switches in the first bridge arm are controlled according to the first bridge arm duty cycle.

In some embodiments, the second bridge arm of the front-stage power conversion unit 20 includes a switch. In the embodiment of FIG. 2A or FIG. 2B, the first bridge arm of the front-stage power conversion unit 20 includes two switches in serial connection, and the two switches are complementary to each other. Moreover, in the step S46, the operations of the switches in the second bridge arm are controlled according to the second bridge arm duty cycle.

In some embodiments, the coordinated fault-tolerant control method includes a step S5 (not shown). In the step S5, if one switch in one of the two rear-stage switch sets in the first side circuit of the rear-stage circuit 3 fails, the amplitude of the AC voltage $v_{ac}$ received by the front-stage power conversion unit 20 is decreased. In one or more embodiments, the step S5 is performed before the steps S1~S4. In some other embodiments, the step S5 is performed after the steps S1~S4. Alternatively, the step S5 is performed between any two steps of the steps S1~S4.

In some situations, if one switch in one of the two rear-stage switch sets in the first side circuit of the rear-stage circuit 3 fails, the current imbalance between the first current $i_{dc1}$ flowing through the first DC terminal T3 and the second current $i_{dc2}$ flowing through the third DC terminal T5 is greater than 50%. However, even if the current imbalance is greater than 50%, the midpoint potential balance can be achieved by using the coordinated fault-tolerant control method of the present disclosure.

For example, the two-stage power module of FIG. 2A is a two-stage three-level power module. If the first switch S1 in the first side circuit of the rear-stage circuit 3 fails (e.g., the open-circuited failure occurs), the second switch S2 is in the close state. In other words, the first side circuit (i.e., the inverter circuit) of the rear-stage circuit 3 becomes the half-bridge circuitry topology. At the same time, the eighth switch S8 in the second side circuit (i.e., the rectifier circuit) is in the close state. In addition, control the midpoint potential of the front-stage circuit 2 balance, thereby making the midpoint potential be regained balance. Similarly, the above fault-tolerant operation can be applied for the open-circuited failure of the second switch S2, the third switch S3 and the fourth switch S4. In case that a switch in the rectifier circuit fails, the complementary switch is in the close state. In other words, the rectifier circuit of the rear-stage circuit 3 becomes the half-bridge circuitry topology, and the inverter circuit of the rear-stage circuit 3 becomes the half-bridge circuitry topology synchronously.

Since the fault-tolerant operation for the failure of any switch in the two-stage three-level power module is implemented, the system reliability is enhanced.

Figure 6A:
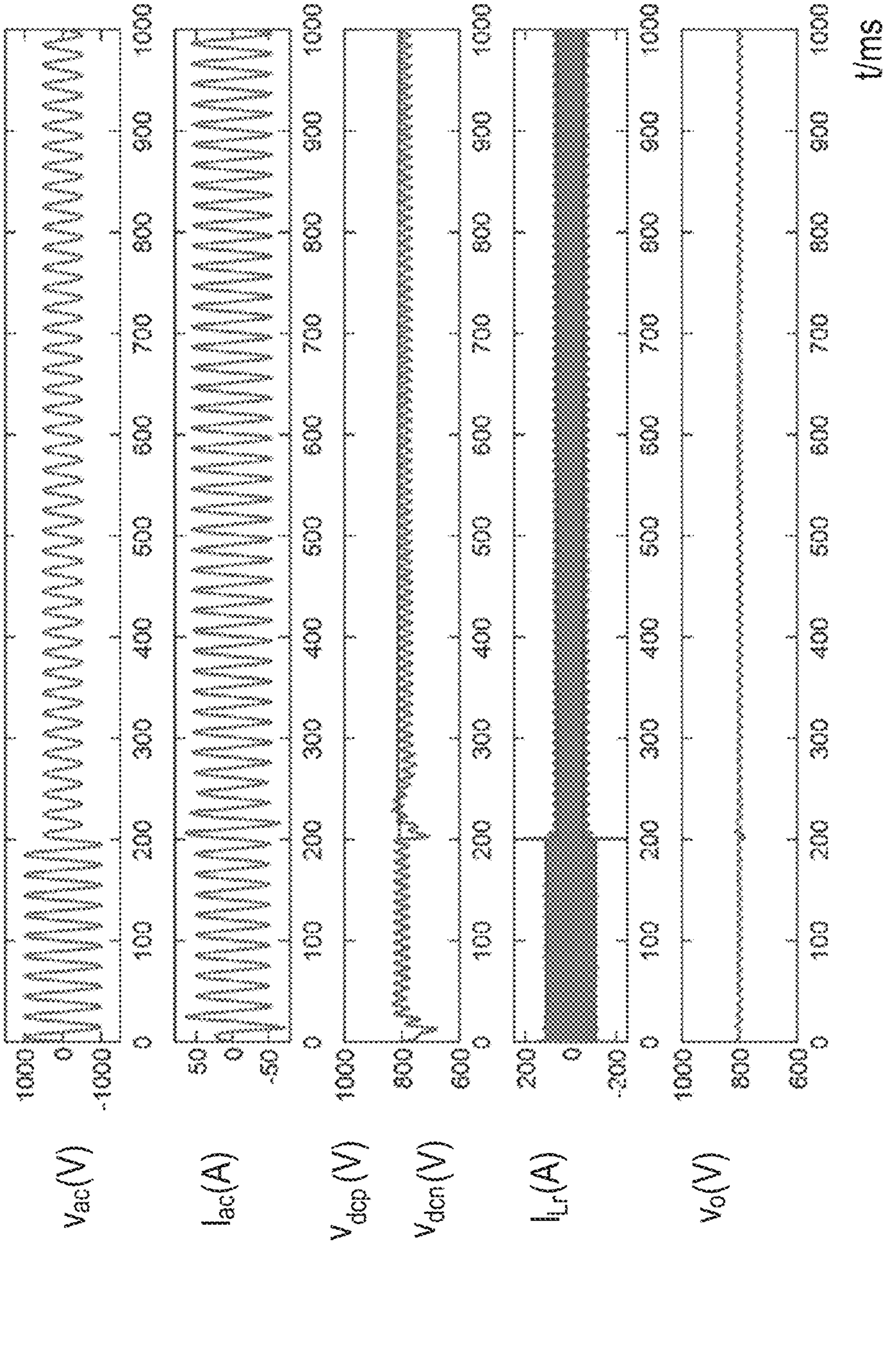
FIG. 6A is a schematic waveform diagram illustrating associated voltages and currents of the two-stage power module shown in FIG. 2A.

FIG. 6A is a schematic waveform diagram illustrating associated voltages and currents of the two-stage power module shown in FIG. 2A. Control the midpoint potential of the front-stage circuit 2 to be regained balance according to the above method. The rear-stage circuit 3 is an LLC resonant converter. The primary side operates in the frequency modulation mechanism. The secondary side operates in the uncontrolled rectification.

At the time t=200 ms, the first switch S1 in the first side circuit of the rear-stage circuit 3 fails. Turn on the second switch S2 which is complementary to the first switch S1, and keep the second switch S2 constant on. The first side circuit of the rear-stage circuit 3 acts as the half-bridge circuit. At the same time, turn on the eighth switch S8 in the second side circuit of the rear-stage circuit 3, and keep the eighth switch S8 constant on. The second side circuit of the rear-stage circuit 3 is subjected to the voltage doubler rectification to stabilize the output voltage. In addition, control the midpoint potential of the front-stage circuit 2 balance.

After the time t=200 ms, the two-stage power module 1 is fault-tolerant and still operated normally. For example, before the failure, the AC voltage $v_{ac}$ is 1000V. After the time t=200 ms, the AC voltage $v_{ac}$ decreases to 500V. The AC input current $I_{ac}$ is stabilized, but the input power decreases. The voltage $v_{dcp}$ of the first capacitor C1 and the voltage $v_{dcn}$ of the second capacitor C2 are substantially equal. The midpoint potential is regained balance. Consequently, the current flowing into the DC midpoint Ce is zero.

Please refer to FIG. 6A. The resonant current $I_{Lr}$ flowing through the resonant inductor of the rear-stage circuit 3 decreases. The output voltage Vo of the two-stage power module 1 is stabilized. That is, the output voltage Vo can meet the requirements, but only the output power decreases as the input power decreases. Similarly, the fault-tolerant operation for the open-circuited failure of the second switch S2, the third switch S3 and the fourth switch S4 can be achieved. In case that a switch in the second side circuit of the rear-stage circuit 3 fails, the complementary switch is in the close state. In other words, the first side circuit of the rear-stage circuit 3 acts as the half-bridge circuit, and the second side circuit of the rear-stage circuit 3 also acts as the half-bridge circuit. Since the fault-tolerant operation for the failure of any switch in the two-stage three-level power module is implemented, the system reliability is enhanced.

Figure 6B:
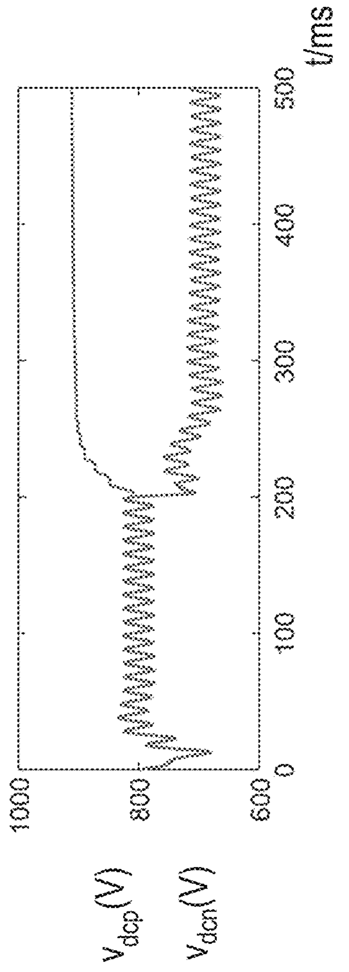
FIG. 6B is a schematic waveform diagram illustrating associated capacitor voltages of the two-stage power module shown in FIG. 2A, in which the control of the midpoint potential of the front-stage circuit is not performed.
Figure 6C:
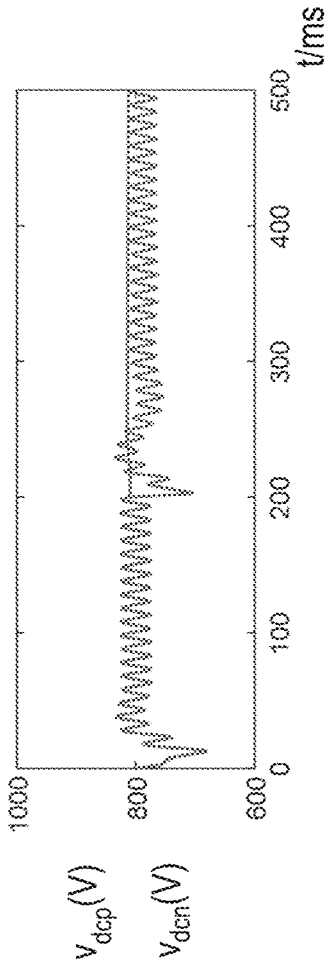
FIG. 6C is a schematic timing waveform diagram illustrating associated capacitor voltages of the two-stage power module shown in FIG. 2A or 2B, in which the control of the midpoint potential of the front-stage circuit is performed.

FIG. 6B is a schematic waveform diagram illustrating associated capacitor voltages of the two-stage power module shown in FIG. 2A, in which the control of the midpoint potential of the front-stage circuit is not performed. FIG. 6C is a schematic waveform diagram illustrating associated capacitor voltages of the two-stage power module shown in FIG. 2A or 2B, in which control the midpoint potential of the front-stage circuit balance.

Please refer to FIG. 6B. In case that the control of the midpoint potential balance of the front-stage circuit is not performed, the difference between the voltage $v_{dcp}$ of the first capacitor C1 and the voltage $v_{dcn}$ of the second capacitor C2 becomes larger. The midpoint imbalance is greater than 50% until the two-stage power module 1 fails.

Please refer to FIG. 6C. The control of the midpoint potential of the front-stage circuit is performed, so the voltage $v_{dcp}$ of the first capacitor C1 and the voltage $v_{dcn}$ of the second capacitor C2 are substantially equal. And the controlling speed is faster. When the current imbalance is larger (e.g., greater than 50%), the method of distributing the bridge arm voltage according to the current can effectively control the DC bus capacitor voltages balance.

Figure 7A:
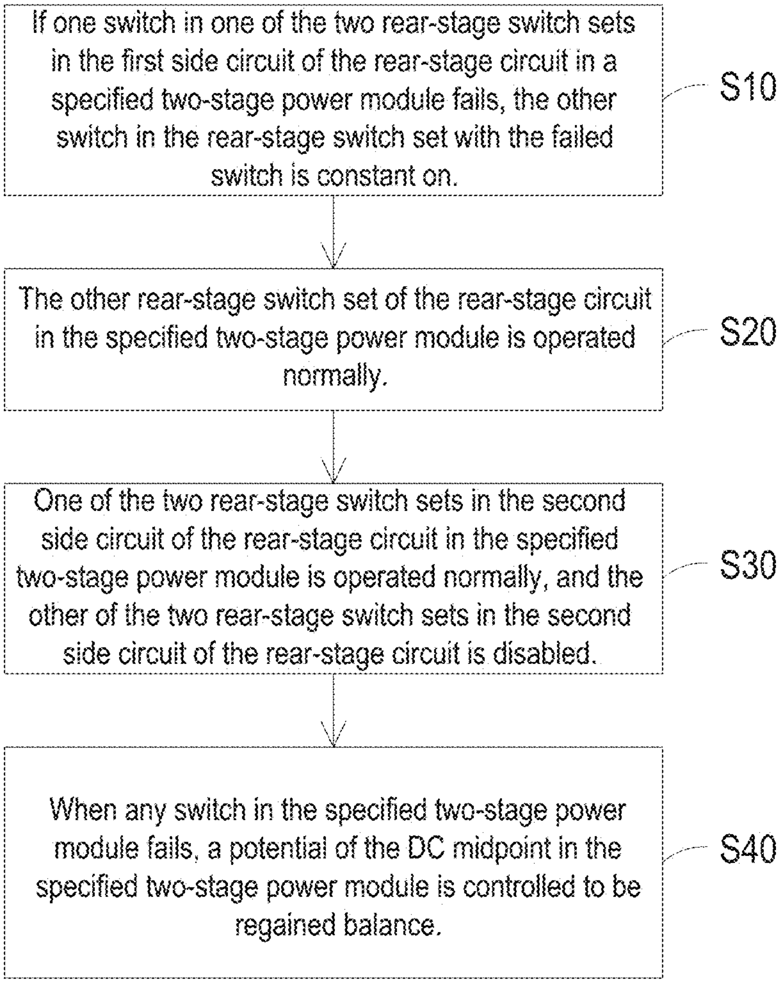
FIG. 7A is a flowchart illustrating a coordinated fault-tolerant control method according to a second embodiment of the present disclosure.
Figure 7B:
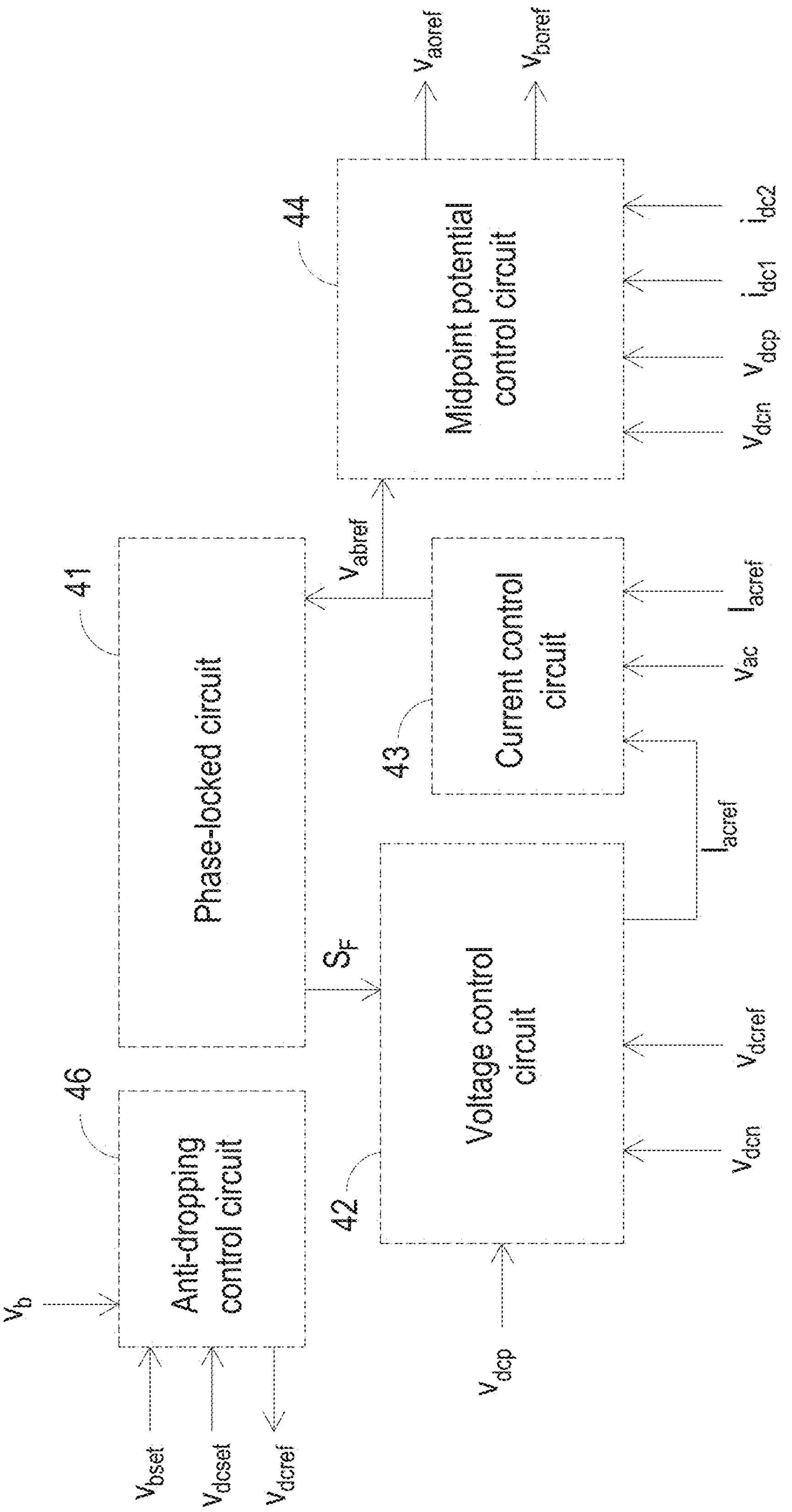
FIG. 7B is a schematic block diagram illustrating a control mechanism of the front-stage circuit in the power module using the coordinated fault-tolerant control method of FIG. 7A.
Figure 8:
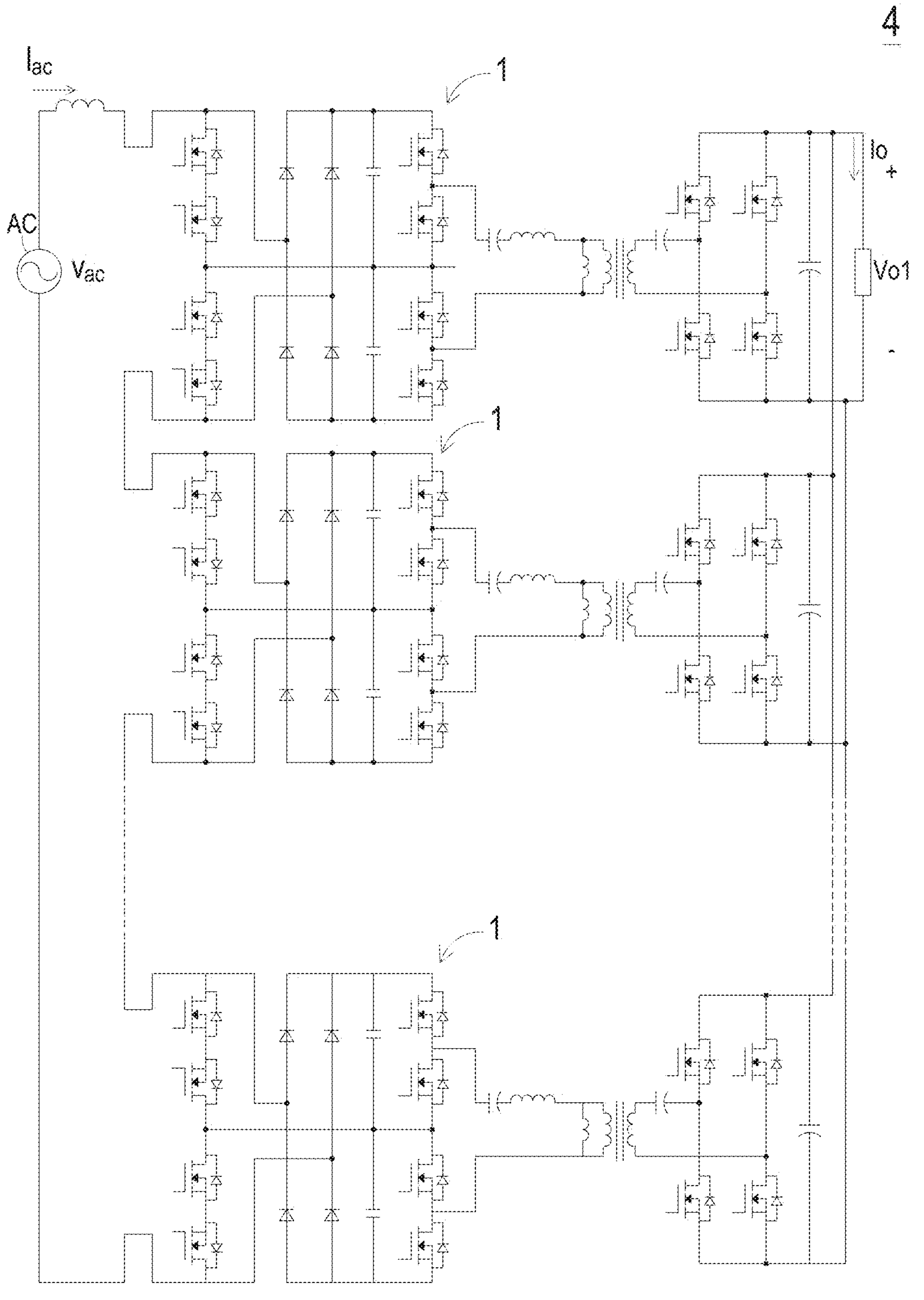
FIG. 8 is a schematic circuit diagram illustrating the circuitry topology of a power system using the coordinated fault-tolerant control method of FIG. 7A.

Please refer to FIGS. 7A, 7B and 8. FIG. 7A is a flowchart illustrating a coordinated fault-tolerant control method according to a second embodiment of the present disclosure. FIG. 7B is a schematic block diagram illustrating a control mechanism of the front-stage circuit in the power module using the coordinated fault-tolerant control method of FIG. 7A. FIG. 8 is a schematic circuit diagram illustrating the circuitry topology of a power system using the coordinated fault-tolerant control method of FIG. 7A. The coordinated fault-tolerant control method of FIG. 7A can be applied to the controller (not shown) of the power system 4 in FIG. 8.

The power system 4 includes a plurality of two-stage power modules 1. The circuitry topology of each two-stage power module is similar to the circuitry topology of the two-stage power module 1 shown in FIG. 2A or FIG. 2B. Of course, the circuitry topology of each two-stage power module may have one of the circuitry topologies in the above variant examples of the two-stage power module. The front-stage circuits in the plurality of two-stage power modules 1 of the power system 4 are connected with each other in series. In addition, the rear-stage circuits in the plurality of two-stage power modules 1 of the power system 4 are connected with each other in parallel.

As shown in FIG. 7A, the coordinated fault-tolerant control method includes the following steps.

In a step S10, if one switch in one of the two rear-stage switch sets in the first side circuit of the rear-stage circuit in a specified two-stage power module fails, the other switch in the rear-stage switch set with the failed switch is constant on.

In a step S20, the other of the two rear-stage switch sets of the rear-stage circuit in the specified two-stage power module is operated normally.

In a step S30, one of the two rear-stage switch sets in the second side circuit of the rear-stage circuit in the specified two-stage power module is operated normally, and the other of the two rear-stage switch sets in the second side circuit of the rear-stage circuit is disabled.

In a step S40, when any switch in the specified two-stage power module fails, a potential of the DC midpoint Ce in the specified two-stage power module is controlled to be regained balance.

The control mechanism of FIG. 7B is similar to the control mechanism of FIG. 5B. However, in comparison with the control mechanism of FIG. 5B, the control mechanism of the front-stage circuit in the power system 4 of FIG. 7B further includes an anti-drooping control circuit 46 for the front-stage bridge arm voltage. The anti-drooping control circuit 46 is configured to receive a bridge arm voltage $v_b$, a bridge arm voltage setting value $v_{bset}$ and a bus voltage setting value $v_{dcset}$. The anti-drooping control circuit 46 is further configured to subtract the bridge arm voltage $v_b$ from the bridge arm voltage setting value $v_{bset}$ to generate a third error signal. The anti-drooping control circuit 46 is further configured to regulate the third error signal to obtain a third reference signal, and configured to subtract the third reference signal from the bus voltage setting value $v_{dcset}$ to obtain the bus voltage reference value $v_{dcref}$.

When a switch failure occurs in a specified power module 1, the bridge arm voltage setting value $v_{bset}$ of the specified power module 1 is decreased by the anti-drooping control circuit 46 of the specified power module 1. However, the bridge arm voltage setting value $v_{bset}$ of each of the other power modules 1 (i.e., the normal power modules) is increased by the anti-drooping control circuit 46 in each of the normal power modules 1.

Correspondingly, the control mechanism for the rear-stage circuit 3 further includes an anti-drooping control circuit (not shown) for the bus voltage. When all power modules in the power system are operated normally, the input voltage is distributed to the plurality of power module 1 in a ratio of 1:1: . . . :1. Whereas, if the switch failure occurs in one of the power modules, for example, the switch failure occurs in the last power module 1, the input voltage is distributed to the plurality of power module 1 in a ratio of 1:1: . . . :0.5.

Since the fault-tolerant operation for the power module is implemented, the system reliability is enhanced. For example, in case that the N+1 redundancy configuration is adopted, the number of the allowable failed power modules in the power system 4 is raised from 1 to 2.

Figure 9A:
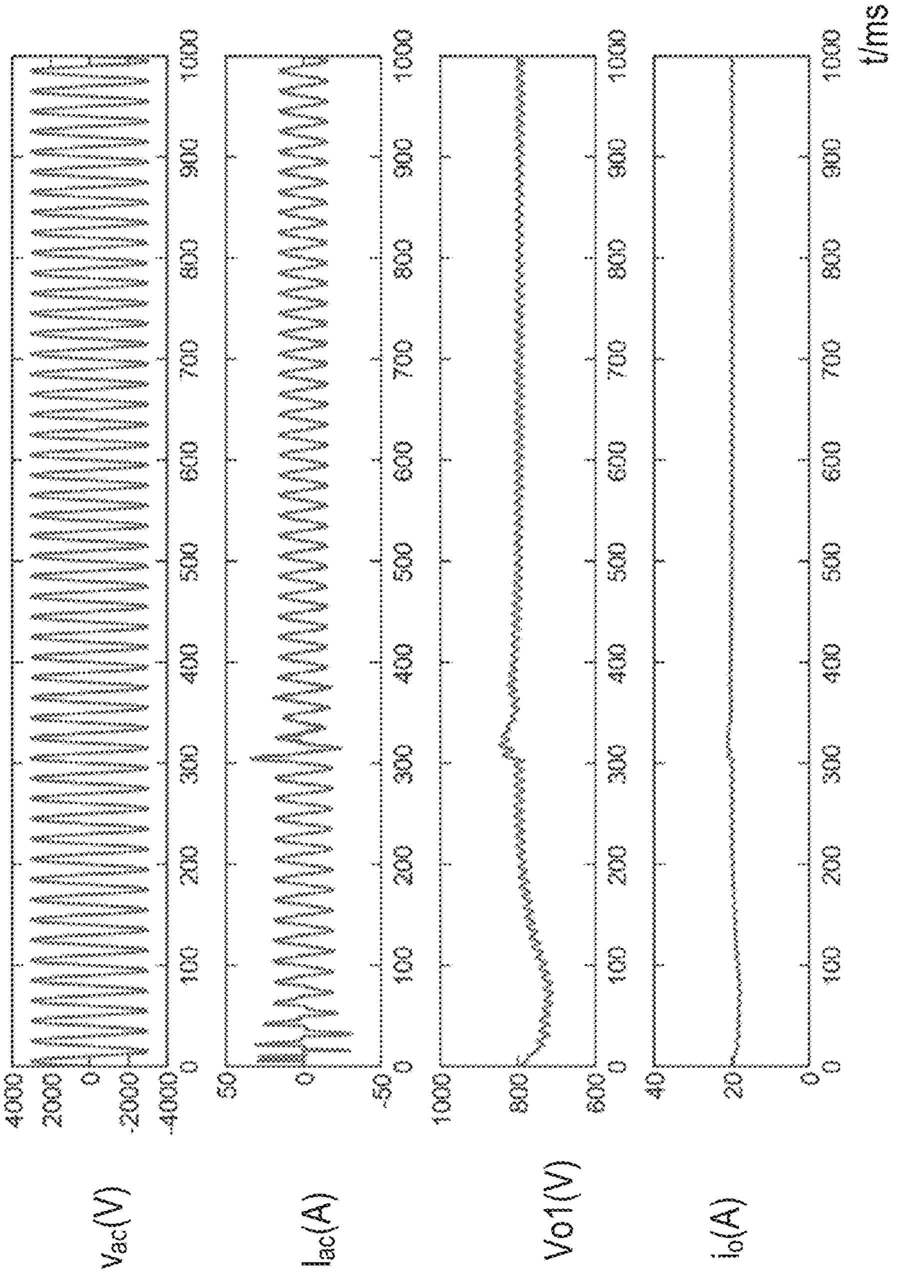
FIG. 9A is a schematic waveform diagram illustrating associated voltages and currents of the power system shown in FIG. 8.
Figure 9B:
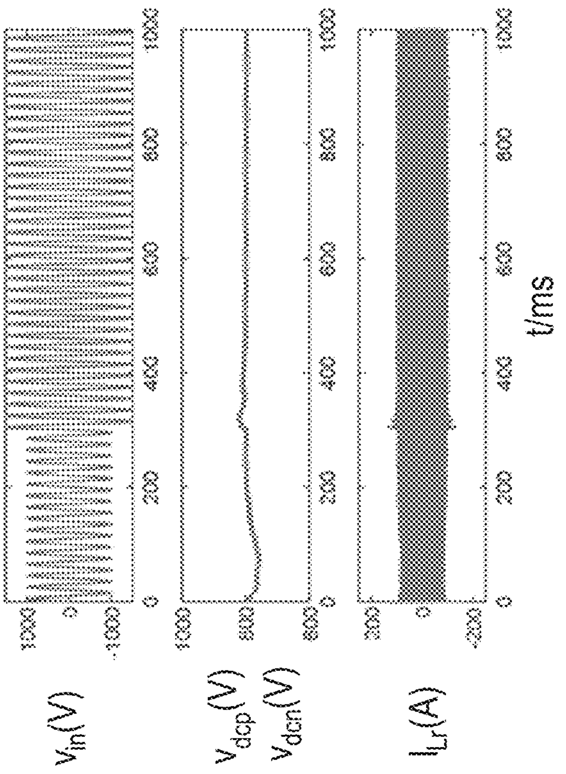
FIG. 9B is a schematic waveform diagram illustrating associated voltages and currents of the first power module in the power system shown in FIG. 8.
Figure 9C:
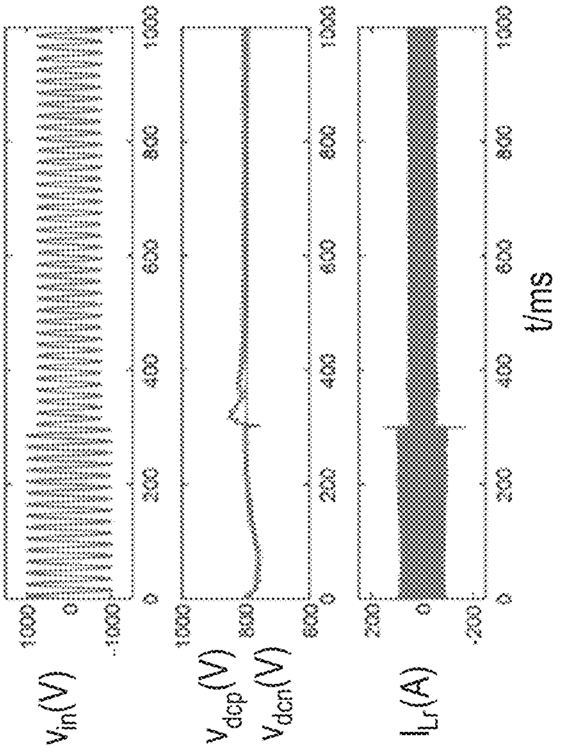
FIG. 9C is a schematic waveform diagram illustrating associated voltages and currents of the second power module in the power system shown in FIG. 8.
Figure 9D:
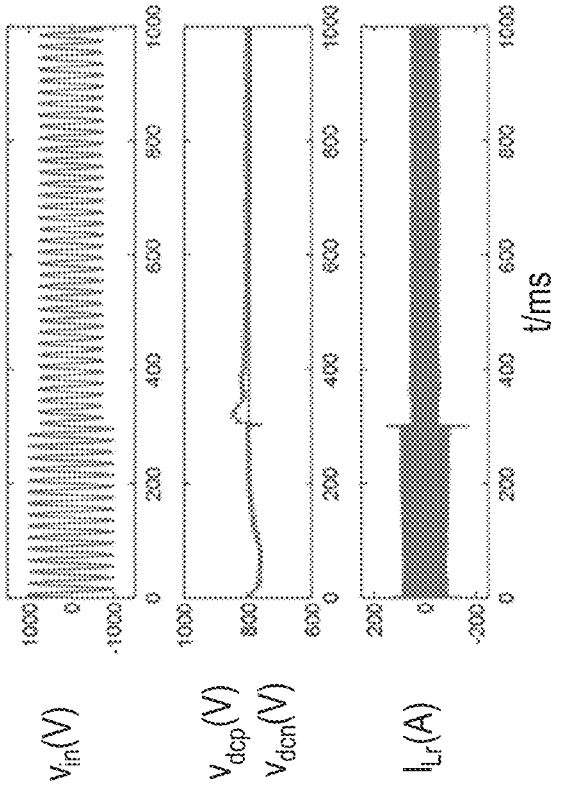
FIG. 9D is a schematic waveform diagram illustrating associated voltages and currents of the third power module in the power system shown in FIG. 8.

In the embodiment of FIG. 8, the power system 4 includes three power modules 1. FIG. 9A is a schematic waveform diagram illustrating associated voltages and currents of the power system shown in FIG. 8. FIG. 9B is a schematic waveform diagram illustrating associated voltages and currents of the first power module in the power system shown in FIG. 8. FIG. 9C is a schematic waveform diagram illustrating associated voltages and currents of the second power module in the power system shown in FIG. 8. FIG. 9D is a schematic waveform diagram illustrating associated voltages and currents of the third power module in the power system shown in FIG. 8.

At the time t=300 ms, the first switch S1 in the first side circuit of the rear-stage circuit in the second power module fails. The complementary switch (i.e., the second switch S2) is constant on, and the eighth switch S8 in the second side circuit of the rear-stage circuit in the second power module is constant on. In addition, control the midpoint potential of the front-stage circuit in the second power module balance. Similarly, the first switch S1 in the first side circuit of the rear-stage circuit in the third power module fails. The complementary switch (i.e., the second switch S2) is constant on, and the eighth switch S8 in the second side circuit of the rear-stage circuit in the third power module is constant on. In addition, control the midpoint potential of the front-stage circuit in the third power module balance.

Please refer to FIG. 9A. The switch failure occurs in both the second power module and the third power module. The input voltage $v_{ac}$ and the input current $I_{ac}$ of the power system 4 are stabilized. The output voltage $V_o$ (e.g., 800V) and the output current $i_o$ of the power system 4 are stabilized, so the output power is kept unchanged.

Please refer to FIG. 9B. The switch failure doesn't occur in the first power module. The amplitude of the input voltage Vin of the first power module is raised from 1000V to 1500V. The input power distributed to the first power module is increased. The voltage $v_{dcp}$ of the first capacitor C1 and the voltage $v_{dcn}$ of the second capacitor C2 are essentially equal (e.g., 800V). In addition, the amplitude of the resonant current $I_{Lr}$ and the amplitude of the magnetized current $i_{LM}$ are essentially kept unchanged.

Please refer to FIG. 9C. The switch failure occurs in the second power module, the amplitude of the input voltage Vin of the second power module is decreased from 1000V to 500V. The input power distributed to the second power module is decreased. The voltage $v_{dcp}$ of the first capacitor C1 and the voltage $v_{dcn}$ of the second capacitor C2 are essentially equal (e.g., 800V). The midpoint potential of the front-stage circuit is regained balance. The resonant current and the magnetized current are decreased.

Please refer to FIG. 9D. The switch failure occurs in the third power module, the amplitude of the input voltage Vin of the third power module is decreased from 1000V to 500V. The input power distributed to the third power module is decreased. The voltage $v_{dcp}$ of the first capacitor C1 and the voltage $v_{dcn}$ of the second capacitor C2 are essentially equal (e.g., 800V). The midpoint potential of the front-stage circuit is regained balance. The resonant current and the magnetized current are decreased.

Please refer to the FIGS. 9A, 9B, 9C and 9D again. At the time t=300 ms, the switch failures occur in two power modules. Fault-tolerant operation for the power system 4 is performed. Control the midpoint potential of the front-stage circuit in the failed power module, thereby making the voltage $v_{dcp}$ of the first capacitor C1 and the voltage $v_{dcn}$ of the second capacitor C2 in each of all two-stage power modules 1 substantially equal. Consequently, the power system 4 can be operated normally, and the midpoint potential of the front-stage circuit in the failed power module is regained balance. Even if two power modules of the power system 4 fail, the fault-tolerant operation of the power system 4 can be performed. Consequently, the fault tolerance capability is enhanced.

Take the 2+1 redundant system as an example to illustrate that the fault-tolerant capability of the power system increases when adopting the coordinated fault-tolerant control method of the present disclosure. In the existing 2+1 redundant system, when the switch failure occurs in one power module, the faulty power module is bypassed. The redundant power module is enabled to replace the faulty power module. In addition, only one power module is allowed to fail. If the switch failure respectively occurs in two power modules, the power system must be shut down. In the 2+1 redundant system of the present disclosure, if the switch failure occurs, the output power of the failed power module is decreased. For example, the output power is reduced to a half of the original value. The redundant power module is enabled to provide a difference of the output power. The redundant power module can provide the difference of the output power required for at least two power modules. Adopting the coordinated fault-tolerant control method of the present disclosure, allow failures to occur in two power modules in the N+1 redundancy configuration. Consequently, the system reliability is enhanced.

From the above descriptions, the present disclosure provides a coordinated fault-tolerant control method. The coordinated fault-tolerant control method is applied to the two-stage power module. When one switch in one of the two rear-stage switch sets in the first side circuit of the rear-stage circuit fails, some rear-stage switch sets in the first side circuit and the second side circuit of the rear-stage circuit are still operated normally. Consequently, the failed power module is maintained in working state, the fault tolerance capability of the two-stage power module is enhanced, and the reliability of the two-stage power module is increased. Moreover, since it is not necessary to add any redundant components to realize the fault-tolerant operation of the two-stage power module, the circuitry complexity of the two-stage power module is reduced, and the cost of the two-stage power module is also reduced. Moreover, if any switch in the two-stage circuit fails to cause the potential of the DC midpoint unbalance, control the potential of the DC midpoint to be regained balance. Consequently, the DC bus voltage can be maintained in the balance state.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A coordinated fault-tolerant control method for a two-stage power module, the two-stage power module comprising a front-stage circuit and a rear-stage circuit, the front-stage circuit having a DC midpoint, each of a first side circuit and a second side circuit of the rear-stage circuit comprising two rear-stage switch sets, each of the rear-stage switch sets comprising two switches in serial connection, the coordinated fault-tolerant control method comprising:

when one switch in one of the two rear-stage switch sets in the first side circuit of the rear-stage circuit fails, disabling the other switch in the rear-stage switch set with the failed switch;

operating the other rear-stage switch set in the first side circuit of the rear-stage circuit in high-frequency switching;

operating one of the two rear-stage switch sets in the second side circuit of the rear-stage circuit, and disabling the other of the two rear-stage switch sets in the second side circuit of the rear-stage circuit; and when any switch in the two-stage power module fails, controlling a potential of the DC midpoint such that a current flowing the DC midpoint is essentially equal to zero.

2. The coordinated fault-tolerant control method according to claim 1, wherein the front-stage circuit further comprises a first DC terminal and a third DC terminal electrically connected with the rear-stage circuit; and a second DC terminal electrically connected with the DC midpoint;

wherein distribute a modulation voltage of the front-stage circuit, according to a current flowing through the first DC terminal and a current flowing through the third DC terminal, so that the DC midpoint is controlled to be regained balance.

3. The coordinated fault-tolerant control method according to claim 2, wherein the front-stage circuit further comprises:

a front-stage power conversion unit configured to receive an AC power, and having a first bridge arm and a second bridge arm;

a first capacitor electrically connected between the first DC terminal and the DC midpoint; and a second capacitor electrically connected between the DC midpoint and the third DC terminal.

4. The coordinated fault-tolerant control method according to claim 3, wherein controlling the potential of the DC midpoint comprises:

obtaining the modulation voltage of the front-stage circuit;

obtaining a voltage of the first capacitor and a voltage of the second capacitor, and obtaining a common mode voltage according to the voltage of the first capacitor and the voltage of the second capacitor;

obtaining the current flowing through the first DC terminal and the current flowing through the third DC terminal;

distributing the modulation voltage to the first bridge arm and the second bridge arm according to the current flowing through the first DC terminal and the current flowing through the third DC terminal, to obtain a first distribution voltage and a second distribution voltage;

superimposing the first distribution voltage on the common mode voltage to obtain a first bridge arm reference voltage, and superimposing the second distribution voltage on the common mode voltage to obtain a second bridge arm reference voltage;

obtaining a first bridge arm duty cycle according to the first bridge arm reference voltage and the voltage of the first capacitor, and obtaining a second bridge arm duty cycle according to the second bridge arm reference voltage and the voltage of the second capacitor; and controlling an operation of the first bridge arm according to the first bridge arm duty cycle and controlling an operation of the second bridge arm according to the second bridge arm duty cycle.

5. The coordinated fault-tolerant control method according to claim 4, wherein obtaining the common mode voltage comprises:

calculating a difference between the voltage of the first capacitor and the voltage of the second capacitor; and regulating the difference to obtain the common mode voltage.

6. The coordinated fault-tolerant control method according to claim 4, wherein the first distribution voltage and the second distribution voltage are calculated according to mathematic formulae:

$$v_{ao} = \frac{i_{dc1}}{i_{dc1} + i_{dc2}} v_{abref}$$

$$v_{bo} = -\frac{i_{dc2}}{i_{dc1} + i_{dc2}} v_{abref}$$

wherein $v_{ao}$ is the first distribution voltage, $v_{bo}$ is the second distribution voltage, $i_{dc1}$ is the current flowing through the first DC terminal, $i_{dc2}$ is the current flowing through the third DC terminal, and $V_{abref}$ is the modulation voltage; and wherein the first bridge arm duty cycle and the second bridge arm duty cycle are calculated according to mathematic formulae:

$$\begin{cases} d_1 = 1 - \dfrac{V_{aoref}}{v_{dcp}} = 1 - \dfrac{\frac{i_{dc1}}{i_{dc1} + i_{dc2}} v_{abref} + v_{com}}{v_{dcp}} \\ d_2 = 1 + \dfrac{V_{boref}}{v_{dcn}} = 1 - \dfrac{\frac{i_{dc2}}{i_{dc1} + i_{dc2}} v_{abref} - v_{com}}{v_{dcn}} \end{cases} (i_{ac} > 0);$$

$$\begin{cases} d_1 = 1 + \dfrac{V_{aoref}}{v_{dcp}} = 1 + \dfrac{\frac{i_{dc1}}{i_{dc1} + i_{dc2}} v_{abref} + v_{com}}{v_{dcp}} \\ d_2 = 1 - \dfrac{V_{boref}}{v_{dcn}} = 1 + \dfrac{\frac{i_{dc2}}{i_{dc1} + i_{dc2}} v_{abref} - v_{com}}{v_{dcn}} \end{cases} (i_{ac} < 0)$$

wherein $d_1$ is the first bridge arm duty cycle, $d_2$ is the second bridge arm duty cycle, $v_{aoref}$ is the first bridge arm reference voltage, $v_{borer}$ is the second bridge arm reference voltage, $v_{com}$ is the common mode voltage, $v_{dcp}$ is the voltage of the first capacitor C1, $v_{dcn}$ is the voltage of the second capacitor C2, and $i_{ac}$ is an AC current of the AC power.

7. The coordinated fault-tolerant control method according to claim 3, wherein when one switch in any rear-stage switch set of the rear-stage circuit fails, an amplitude of an AC voltage of the AC power is decreased.

8. The coordinated fault-tolerant control method according to claim 2, wherein when one switch in any rear-stage switch set of the rear-stage circuit fails, a current imbalance between the current flowing through the first DC terminal and the current flowing through the third DC terminal is greater than 50%.

9. A coordinated fault-tolerant control method for a power system with a plurality of two-stage power modules, each of the plurality of two-stage power modules comprising a front-stage circuit and a rear-stage circuit, the front-stage circuit having a DC midpoint, each of a first side circuit and a second side circuit of the rear-stage circuit comprising two rear-stage switch sets, each of the rear-stage switch sets comprising two switches in serial connection, the coordinated fault-tolerant control method comprising:

when one switch in one of the two rear-stage switch sets in the first side circuit of the rear-stage circuit in a specified two-stage power module of the plurality of two-stage power modules fails, disabling the other switch in the rear-stage switch set with the failed switch;

operating the other rear-stage switch set in the first side circuit of the rear-stage circuit in the specified two-stage power module in high-frequency switching;

operating one of the two rear-stage switch sets in the second side circuit of the rear-stage circuit in the specified two-stage power module in high-frequency switching, and disabling the other of the two rear-stage switch sets in the second side circuit of the rear-stage circuit; and when any switch in the specified two-stage power module fails, controlling a potential of the DC midpoint in the specified two-stage power module to be regained balance.

10. The coordinated fault-tolerant control method according to claim 9, wherein the front-stage circuit of the specified two-stage power module further comprises a first DC terminal and a third DC terminal electrically connected with the rear-stage circuit; and a second DC terminal electrically connected with the DC midpoint;

wherein distribute a modulation voltage of the front-stage circuit according to a current flowing through the first DC terminal and a current flowing through the third DC terminal, so that a current flowing the DC midpoint is essentially equal to zero.

11. The coordinated fault-tolerant control method according to claim 10, wherein the front-stage circuit of the specified two-stage power module further comprises:

a front-stage power conversion unit configured to receive an AC power, and having a first bridge arm and a second bridge arm;

a first capacitor electrically connected between the first DC terminal and the DC midpoint; and a second capacitor electrically connected between the DC midpoint and the third DC terminal.

12. The coordinated fault-tolerant control method according to claim 11, wherein controlling the potential of the DC midpoint in the specified two-stage power module comprises:

obtaining the modulation voltage of the front-stage circuit;

obtaining a voltage of the first capacitor and a voltage of the second capacitor, and obtaining a common mode voltage according to the voltage of the first capacitor and the voltage of the second capacitor;

obtaining the current flowing through the first DC terminal and the current flowing through the third DC terminal;

distributing the modulation voltage to the first bridge arm and the second bridge arm according to the current flowing through the first DC terminal and the current flowing through the third DC terminal, to obtain a first distribution voltage and a second distribution voltage;

superimposing the first distribution voltage on the common mode voltage to obtain a first bridge arm reference voltage, and superimposing the second distribution voltage on the common mode voltage to obtain a second bridge arm reference voltage;

obtaining a first bridge arm duty cycle according to the first bridge arm reference voltage and the voltage of the first capacitor, and obtaining a second bridge arm duty cycle according to the second bridge arm reference voltage and the voltage of the second capacitor; and controlling an operation of the first bridge arm according to the first bridge arm duty cycle and controlling an operation of the second bridge arm according to the second bridge arm duty cycle.

13. The coordinated fault-tolerant control method according to claim 11, wherein when one switch in any rear-stage switch set of the rear-stage circuit in the specified two-stage power module fails, an amplitude of an AC voltage of the AC power received by the front-stage power conversion unit is decreased.

14. The coordinated fault-tolerant control method according to claim 10, wherein when one switch in any rear-stage switch set of the rear-stage circuit fails, a current imbalance between the current flowing through the first DC terminal and the current flowing through the third DC terminal is greater than 50%.

15. A two-stage power module, comprising:

a front-stage circuit having a DC midpoint;

a rear-stage circuit electrically connected the front-stage circuit, wherein each of a first side circuit and a second side circuit of the rear-stage circuit comprises two rear-stage switch sets, and each of the rear-stage switch sets comprises two switches in serial connection; and a controller is configured to:

when one switch in one of the two rear-stage switch sets in the first side circuit of the rear-stage circuit fails, disabling the other switch in the rear-stage switch set with the failed switch;

operating the other rear-stage switch set in the first side circuit of the rear-stage circuit in high-frequency switching;

operating one of the two rear-stage switch sets in the second side circuit of the rear-stage circuit, and disabling the other of the two rear-stage switch sets in the second side circuit of the rear-stage circuit; and when any switch in the two-stage power module fails, controlling a potential of the DC midpoint such that a current flowing the DC midpoint is essentially equal to zero.

16. The two-stage power module according to claim 15, wherein the second side circuit of the rear-stage circuit is electrically connected between the front-stage circuit and a primary winding of a transformer, and the first side circuit of the rear-stage circuit is electrically connected with a secondary winding of the transformer; or wherein the first side circuit of the rear-stage circuit is electrically connected between the front-stage circuit and a primary winding of a transformer, and the second side circuit of the rear-stage circuit is electrically connected with a secondary winding of the transformer.

17. The two-stage power module according to claim 15, wherein the front-stage circuit further comprises a first DC terminal and a third DC terminal electrically connected with the rear-stage circuit; and a second DC terminal electrically connected with the DC midpoint;

wherein distribute a modulation voltage of the front-stage circuit, according to a current flowing through the first DC terminal and a current flowing through the third DC terminal, so that the DC midpoint is controlled to be regained balance.

18. The two-stage power module according to claim 17, wherein the front-stage circuit further comprises:

a front-stage power conversion unit configured to receive an AC power, and having a first bridge arm and a second bridge arm;

a first capacitor electrically connected between the first DC terminal and the DC midpoint; and a second capacitor electrically connected between the DC midpoint and the third DC terminal.

19. The two-stage power module according to claim 18, wherein the controller is further configured to:

obtaining the modulation voltage of the front-stage circuit;

obtaining a voltage of the first capacitor and a voltage of the second capacitor, and obtaining a common mode voltage according to the voltage of the first capacitor and the voltage of the second capacitor;

obtaining the current flowing through the first DC terminal and the current flowing through the third DC terminal;

distributing the modulation voltage to the first bridge arm and the second bridge arm according to the current flowing through the first DC terminal and the current flowing through the third DC terminal, to obtain a first distribution voltage and a second distribution voltage;

superimposing the first distribution voltage on the common mode voltage to obtain a first bridge arm reference voltage, and superimposing the second distribution voltage on the common mode voltage to obtain a second bridge arm reference voltage;

obtaining a first bridge arm duty cycle according to the first bridge arm reference voltage and the voltage of the first capacitor, and obtaining a second bridge arm duty cycle according to the second bridge arm reference voltage and the voltage of the second capacitor; and controlling an operation of the first bridge arm according to the first bridge arm duty cycle and controlling an operation of the second bridge arm according to the second bridge arm duty cycle.

20. The two-stage power module according to claim 19, wherein the first bridge arm comprises one switch or two complementary switches, which are operated according to the first bridge arm duty cycle, wherein the second bridge arm comprises one switch or two complementary switches, which are operated according to the second bridge arm duty cycle.

* * * * *